(12) United States Patent
Yamakura et al.

(10) Patent No.: US 6,920,016 B2
(45) Date of Patent: Jul. 19, 2005

(54) THIN FILM MAGNETIC HEAD

(75) Inventors: Hideo Yamakura, Yokohama (JP);
 Shinji Sasaki, Yokohama (JP);
 Hidetoshi Anan, Yokohama (JP); Akio Takakura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 167 days.

(21) Appl. No.: 10/331,662

(22) Filed: Dec. 31, 2002

(65) Prior Publication Data
US 2003/0227716 A1 Dec. 11, 2003

(30) Foreign Application Priority Data

Jun. 10, 2002 (JP) .................................. 2002-168826

(51) Int. Cl.⁷ .............................................. G11B 5/60
(52) U.S. Cl. .................. 360/235.7; 360/234.7
(58) Field of Search ............................ 360/126, 235.5, 360/235.7, 235.8, 236.3, 234.7

(56) References Cited

U.S. PATENT DOCUMENTS

| | | | | |
|---|---|---|---|---|
| 5,687,045 A | * | 11/1997 | Okai et al. ................. | 360/126 |
| 5,822,153 A | * | 10/1998 | Lairson et al. ............ | 360/234.7 |
| 6,219,200 B1 | * | 4/2001 | Waki et al. ................. | 360/126 |
| 6,424,494 B1 | * | 7/2002 | Koishi ...................... | 360/235.6 |
| 6,462,909 B1 | * | 10/2002 | Boutaghou et al. ....... | 360/235.8 |
| 6,525,909 B1 | * | 2/2003 | Qian et al. ................ | 360/235.7 |
| 6,556,381 B2 | * | 4/2003 | Kohira et al. ............. | 360/236.3 |
| 6,556,389 B1 | * | 4/2003 | Boutaghou et al. ....... | 360/320 |
| 6,657,820 B2 | * | 12/2003 | Kohira et al. ............. | 360/236.3 |
| 6,661,605 B1 | * | 12/2003 | Pust et al. ................. | 360/126 |
| 6,724,572 B1 | * | 4/2004 | Stoev et al. ............... | 360/126 |
| 2001/0030834 A1 | * | 10/2001 | Kohira et al. ............. | 360/235.8 |
| 2002/0105758 A1 | * | 8/2002 | Chiba et al. .............. | 360/235.4 |

FOREIGN PATENT DOCUMENTS

| | | |
|---|---|---|
| JP | A-11-302636 | 11/1999 |
| JP | A-2001-236619 | 8/2001 |
| JP | A-2001-297421 | 10/2001 |

\* cited by examiner

*Primary Examiner*—Brian E. Miller
(74) *Attorney, Agent, or Firm*—Antonelli, Terry, Stout & Kraus, LLP

(57) ABSTRACT

A thin film magnetic head includes a three-step configuration including deep and shallow groove surfaces, a super shallow groove surface, and an air bearing surface, and also, island-shaped center rail is provided in the center of the air outflow end of the disk-facing air bearing surface having a boundary on the surface of base alumina between a head element portion and a substrate, without including the surface of the substrate. Further, by providing in the surface of the substrate the super shallow groove surface shallower than a shallow groove surface, an alumina recession between the surface of the substrate and the head element portion, produced in a shallow dual step sub ambient slider, can be eliminated. Magnetic spacing between the head of the head element portion and the magnetic layer of the disk can be thereby reduced.

10 Claims, 14 Drawing Sheets

IV—IV

VIII—VIII

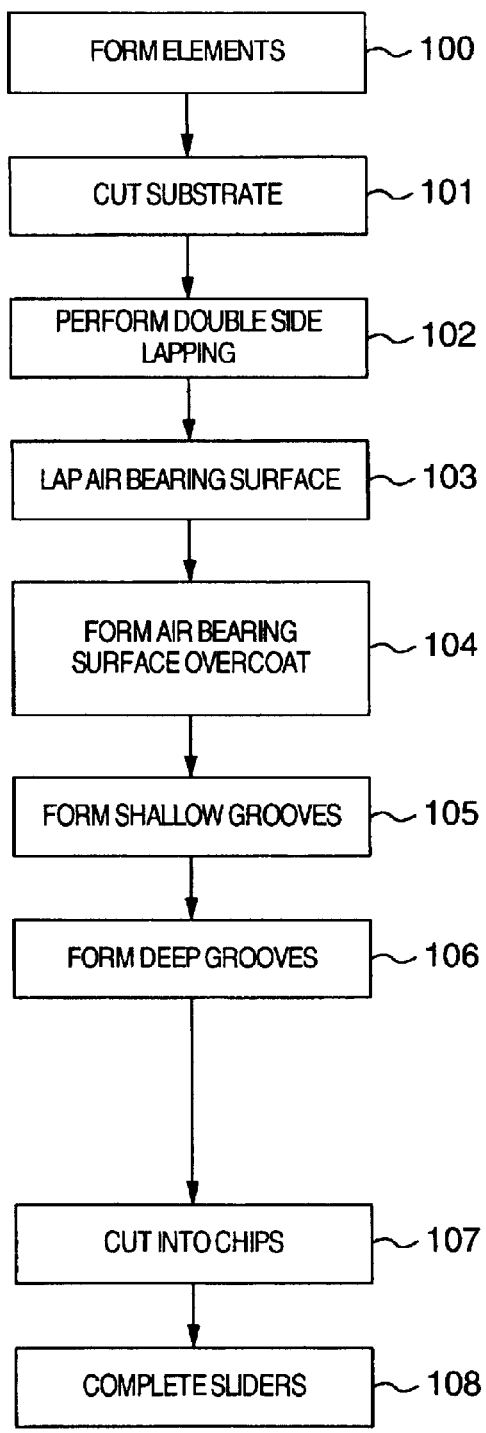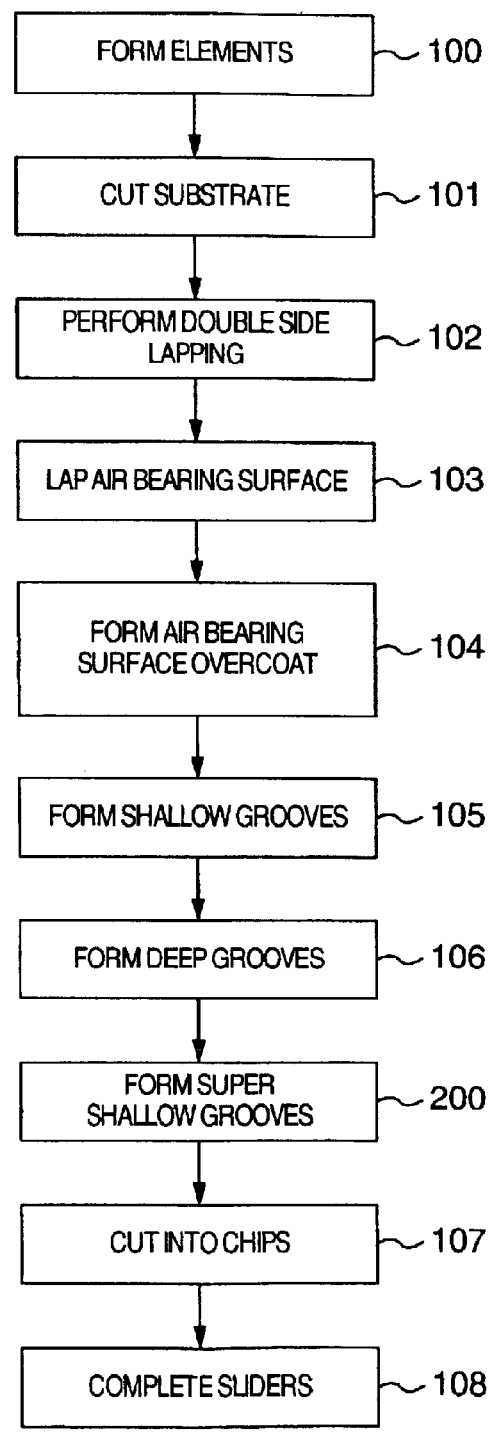

FIG.11

| | THIN FILM MAGNETIC HEAD FOR COMPARISON | | | THIN FILM MAGNETIC HEAD ACCORDING TO FIRST EMBODIMENT | | |
|---|---|---|---|---|---|---|
| | ALUMINA RECESSION | POLE RECESSION | POLE TIP RECESSION | ALUMINA RECESSION | POLE RECESSION | POLE TIP RECESSION |
| 1 | 2.43 | 0.77 | 3.2 | — | 0.35 | 0.35 |
| 2 | 2.87 | 0.26 | 3.13 | — | 0.28 | 0.28 |
| 3 | 2.46 | 0.36 | 2.82 | — | 0.69 | 0.69 |
| 4 | 2.26 | 0.54 | 2.8 | — | 0.24 | 0.24 |
| 5 | 2.28 | 0.71 | 2.99 | — | 0.38 | 0.38 |
| 6 | 2.87 | 0.19 | 3.06 | — | 0.37 | 0.37 |
| 7 | 2.44 | 0.35 | 2.79 | — | 0.36 | 0.36 |
| 8 | 2.35 | 0.44 | 2.79 | — | 0.42 | 0.42 |
| 9 | 2.36 | 0.49 | 2.85 | — | 0.55 | 0.55 |
| 10 | 2.68 | 0.25 | 2.93 | — | 0.42 | 0.42 |
| 11 | 2.72 | 0.29 | 3.01 | — | 0.16 | 0.16 |
| 12 | 2.56 | 0.41 | 2.97 | — | 0.29 | 0.29 |
| 13 | 2.43 | 0.52 | 2.95 | — | 0.43 | 0.43 |
| 14 | 2.33 | 0.54 | 2.87 | — | 0.53 | 0.53 |
| 15 | 2.65 | 0.29 | 2.94 | — | 0.59 | 0.59 |
| 16 | 2.26 | 0.59 | 2.85 | — | 0.27 | 0.27 |
| 17 | 2.58 | 0.68 | 3.26 | — | 0.33 | 0.33 |
| 18 | 2.76 | 0.42 | 3.18 | — | 0.38 | 0.38 |
| 19 | 2.38 | 0.67 | 3.05 | — | 0.61 | 0.61 |
| 20 | 2.59 | 0.39 | 2.98 | — | 0.64 | 0.64 |
| AVERAGE | 2.51 | 0.46 | 2.97 | — | 0.41 | 0.41 |
| MAXIMUM | 2.87 | 0.77 | 3.26 | — | 0.69 | 0.69 |
| MINIMUM | 2.26 | 0.19 | 2.79 | — | 0.16 | 0.16 |

ENLARGED SECTIONAL VIEW OF PORTION A

FIG.15

| | THIN FILM MAGNETIC HEAD FOR COMPARISON | | | THIN FILM MAGNETIC HEAD ACCORDING TO SECOND EMBODIMENT | | |
|---|---|---|---|---|---|---|
| | ALUMINA RECESSION | POLE RECESSION | POLE TIP RECESSION | ALUMINA RECESSION | POLE RECESSION | POLE TIP RECESSION |
| 1 | 2.43 | 0.77 | 3.2 | — | — | 0.38 |
| 2 | 2.87 | 0.26 | 3.13 | — | — | 0.65 |
| 3 | 2.46 | 0.36 | 2.82 | — | — | 0.34 |
| 4 | 2.26 | 0.54 | 2.8 | — | — | 0.29 |
| 5 | 2.28 | 0.71 | 2.99 | — | — | 0.45 |
| 6 | 2.87 | 0.19 | 3.06 | — | — | 0.46 |
| 7 | 2.44 | 0.35 | 2.79 | — | — | 0.49 |
| 8 | 2.35 | 0.44 | 2.79 | — | — | 0.38 |
| 9 | 2.36 | 0.49 | 2.85 | — | — | 0.27 |
| 10 | 2.68 | 0.25 | 2.93 | — | — | 0.39 |
| 11 | 2.72 | 0.29 | 3.01 | — | — | 0.25 |
| 12 | 2.56 | 0.41 | 2.97 | — | — | 0.59 |
| 13 | 2.43 | 0.52 | 2.95 | — | — | 0.27 |
| 14 | 2.33 | 0.54 | 2.87 | — | — | 0.3 |
| 15 | 2.65 | 0.29 | 2.94 | — | — | 0.32 |
| 16 | 2.26 | 0.59 | 2.85 | — | — | 0.43 |
| 17 | 2.58 | 0.68 | 3.26 | — | — | 0.26 |
| 18 | 2.76 | 0.42 | 3.18 | — | — | 0.37 |
| 19 | 2.38 | 0.67 | 3.05 | — | — | 0.35 |
| 20 | 2.59 | 0.39 | 2.98 | — | — | 0.28 |
| AVERAGE | 2.51 | 0.46 | 2.97 | — | — | 0.38 |
| MAXIMUM | 2.87 | 0.77 | 3.26 | — | — | 0.65 |
| MINIMUM | 2.26 | 0.19 | 2.79 | — | — | 0.25 |

XVII — XVII

THIN FILM MAGNETIC HEAD

BACKGROUND OF THE INVENTION

The present invention relates to a thin film magnetic head having an inductive magnetic head as a write head element and a magneto-resistance effect type head element as a read head element, both provided on a substrate. More specifically, the invention relates to a thin film magnetic head in which island-shaped rails are formed in a surface facing a recording medium, thereby causing the head to fly with respect to the recording medium.

In recent years, magnetic disk drives are becoming smaller in size and larger in capacity. Currently, small magnetic disk drives employing 3.5-inch and 2.5-inch disk-shaped recording media (hereinafter to be simply referred to as disks) have become main stream.

In the magnetic disk drive, the disk rotates at a low speed. Thus, when the inductive magnetic head of which a read output depends on a disk rotation speed is employed, the read output is reduced. On contrast therewith, in the magneto-resistance effect type head employing a magneto-resistance effect element which detects a change in resistance caused by a change in a magnetic field, thereby producing the read output, the read output does not depend on the rotation speed of the disk. Thus, even in the small magnetic disk drive, a high read output can be obtained.

Further, in the magneto-resistance effect type head, the read output that is higher than that with the inductive magnetic head can be obtained from narrower tracks as well, which are associated with a trend toward a higher recording density. Accordingly, the magneto-resistance effect type head can be conceived as a magnetic head suitable for achievement of smaller size and larger capacity.

In view of this fact, in the small magnetic disk drive, the thin film magnetic head having the inductive magnetic head as the write head element and the magneto-resistance effect type head as the read head element, in combination, is employed.

Among the magneto-resistance effect type heads are Anisotropic Magneto Resistive (AMR) heads that employ AMR elements, Giant Magneto Resistive (GMR) heads that employ GMR elements, and Tunneling Magneto Resistive heads that employ TMR elements. These are used in the form of the read head element for the thin-film magnetic head. These three types of magneto-resistance effect type heads will be generically referred to as MR head elements of the thin-film magnetic head, while the magnetic materials thereof will be referred to as MR elements.

In the MR head element, in order to obtain a change in the resistance of the MR element caused by a change in the magnetic field to achieve the highest read efficiency, the MR element should be exposed at the disk-facing surface of a magnetic head slider. This disk-facing surface will be hereinafter referred to as an air bearing surface.

In the MR head element having the MR element exposed at the air bearing surface thereof as described above, part of the MR element is also lapped during processing of the air bearing surface, thereby exposing the end of the MR element at the air bearing surface. In the write head element that writes data on the disk by means of a leakage flux as well, the leading ends of the upper and lower poles of the write head element are also lapped during processing of the air bearing surface, like the MR head element lapped, thereby exposing the ends of the write head element at the air bearing surface.

Generally, the thin-film magnetic head having the write head element and the read head element as described above is fabricated as follows:

First, an $Al_2O_3$ (alumina) layer having a film thickness of 2 to 10 μm is formed as an insulation film (to be referred to as base alumina) on a hard substrate made of a material such as $Al_2O_3$—TiC (alumina titanium carbide) or SIC (silicon carbide), and a shield layer, a gap layer, an MR element, the upper and lower poles of the write head element, a protective film of the alumina layer are laminated thereon in this stated order. This laminate structure is formed on a 5-inch substrate by thin film forming processing using lithography.

This substrate is cut into two-inch rectangular pieces (e.g. row bars) by means of a diamond grindstone, warps resulting from cutting are removed by a method such as double side lapping, and then one surface of the laminate structure on the substrate (or the end surfaces of the respective layers) is lapped with a high degree of accuracy, thereby forming the disk-facing air bearing surfaces.

Then, rails for generating a negative pressure to cause the respective thin film magnetic heads to fly from the surface of the disk are formed in the form of islands using a dry process such as ion milling. Then, after formation of the rails, small pieces (e.g. sliders) each including a laminate structure (e.g. a head element portion) is cut from the row bar, thereby completing thin film magnetic heads.

As a method of lapping the air bearing surfaces in the state of the row bar, there is employed a lapping method in which the row bar adhered to a lapping jig is pressed and slid while dropping a lapping slurry including lapping particles such as diamond onto a rotating circular plate made of a soft metal.

The thin film magnetic head is formed of composite materials constituted by soft metals such as parmalloy, alumina, and alumina titanium carbide. The soft metals are used for the MR head element as the read head element and the upper and lower poles of the inductive magnetic head element as the write head element in the head element portion, alumina is used for the insulating protective film, and alumina titanium carbide is used for a slider substrate member. Hardness varies among these materials. Thus, if lapping of the air bearing surface is performed, the head element portion that includes the MR head element, the upper and lower poles of the write head element, formed of the soft metals is recessed, thereby producing a recession in the air bearing surface.

This recession is referred to as a pole tip recession or a PTR. The pole tip recession is defined as a recession produced between the surface of the head element portion and the surface of a substrate member. The surface of the head element portion is constituted by the upper and lower shield layers and the magnetic film of the MR head element and the upper and lower poles of the write head element, formed of the soft metals. The surface of the substrate member is constituted by a hard ceramic such as $Al_2O_3$—TiC or SiC.

A recession produced between the surface of the head element portion and the insulating protective film formed of alumina is referred to as a pole recession, while a recession produced between the surface of the insulating protective film and the substrate member is referred to as the alumina recession. Accordingly, the pole tip recession is defined as the sum of the pole recession and the alumina recession.

On the other hand, in order to improve the areal density of the magnetic disk drive, it is essential to reduce a gap (a flying height) between the surface of the disk and the air bearing surface of the thin film magnetic head, thereby reducing magnetic spacing. The magnetic spacing is the distance between the MR head element and the write head element, exposed at the air bearing surface and the magnetic film surface of the disk. However, even if the flying height is reduced, the magnetic spacing will increase if the pole tip recession increases. Thus, in order to improve the areal density, a reduction in the pole tip recession is required.

Among the methods of reducing the pole tip recession, there is known the one described in JP-A-11-302636.

A surface 51 facing the disk (air bearing surface flying from the disk) of a thin film magnetic head slider 50 described therein has a configuration illustrated in FIG. 16. The air bearing surface 51 includes a convex portion 52 generally formed along three sides, and a concave portion 53 relative to the convex portion 52, which extends from the center of the air bearing surface 51 to one side of the air bearing surface 51. Air flows out from the side at both ends of the convex portion 52 (upper side in FIG. 16). Accordingly, when this air outflow end is used, the direction in which the head moves with respect to the disk, not illustrated, becomes vertical in the drawing. On one end of the concave portion 52 or on one side end of the air outflow side (air outflow end), a head element portion 54 that includes the write head element and the read head element is provided. With this arrangement, data recording on the disk and data reproduction from the disk are performed.

FIG. 17 is a diagram showing a vertical section of the slider 50 in a step of a thin film magnetic head manufacturing process. This is the cross section shown by the arrows XVII—XVII in FIG. 16.

In this step, the head element portion 54 protected by an insulation layer 56 is provided for a substrate 55, and the air bearing surface 51 that includes the surfaces of the head element section 54 and the substrate 55 is lapped.

As a material for the substrate 55, $Al_2O_3$—TiC (AlTic) is employed, while as the insulation layer 56, $Al_2O_3$ (alumina) is employed. $Al_2O_3$—TiC is harder than $Al_2O_3$. For this reason, when the air bearing surface 51 is lapped, the recession or the alumina recession of approximately 4–5 nm is produced between the surface of the substrate 55 and the surface of the insulation layer 56. Incidentally, since elements such as an MR head element 57, an upper pole 58 and a lower pole 59 of the write head element, and a lower shield layer 60 in the head element portion 54 have lower hardness than the insulation layer 56, a recession (a pole recession) is also produced between these elements in the head element portion 54 and the insulation layer 56. When the air bearing surface 51 is lapped, however, the alumina insulation layer 56 is chemically etched by an alkali slurry. Hence this reduces the pole recession between the insulation layer 56 and the head element portion 54 to substantially zero. The pole tip recession becomes therefore substantially equal to the alumina recession.

After the air bearing surface 51 configured as described above has been lapped, a mask 61 is provided for the surface of the insulation layer 56, and then the surface of the substrate 55 is etched, as illustrated in FIG. 18. With this arrangement, the surface of the insulation layer 56 and the surface of the substrate 55 in the air bearing surface 51 are disposed on the same plane, or the pole tip recession is reduced to zero. Alternatively, the surface of the insulation layer 56 protrudes more towards a disk 62 than the surface of the substrate 55. Then, a protective film 63 made of DLC is formed over the entire air bearing surface 51.

Since the thin film magnetic head is configured as described above, the following effects can be obtained. If the protective film 63 is provided without removing the alumina recession of 4–5 nm, as shown in FIG. 17, the flying height, which is defined as the minimum distance between the thin film magnetic head 50 and the disk 62 during the operation of the magnetic head drive as illustrated in FIG. 19 is determined by the surface of the substrate 55. The distance between the surface of the head element portion 54 and the magnetic film of the disk 62 (not shown) or the magnetic spacing (referred to as a "magnetic space" in JP-A-2001-236619) becomes larger than the flying height by the pole tip recession (being substantially equal to the alumina recession). However, as described in FIGS. 18 and 19, the pole tip recession is reduced to substantially zero. Thus, the magnetic spacing is correspondingly reduced, so that the read output is improved.

As illustrated in FIG. 2 and as will be described below in detail, there is known a thin film magnetic head, a disk-facing surface 3 of which has an island-shaped rail 10a in the center of an air outflow end 8, an island-shaped rail 10b at an air inflow end, and a head element portion 7 for the island-shaped rail 10a at the air outflow end. The island-shaped rail (center rail) 10a includes a center rail shallow groove surface 5a and a center rail flying surface 4a. The center rail shallow groove surface 5a protrudes from a deep groove surface 6 by a predetermined height, while the center rail flying surface 4a protrudes from the center rail shallow surface 5a by a predetermined height. The end surface of the head element portion 7 protected by a protective layer is exposed at the center rail flying surface 4a.

The island-shaped rail (air inflow end rail) 10b includes an air inflow end rail shallow groove surface 5b and air inflow end rail flying surfaces 4b and 4c. The air inflow end rail shallow groove surface 5b is disposed along an air inflow end 9 and protrudes from the deep groove surface 6 by a predetermined height. The air inflow end rail flying surfaces 4b and 4c protrude from both ends of the air inflow rail shallow groove surface 5b by a predetermined height.

Since the thin film magnetic head has a shallow groove 5 between an air bearing surface 4 and the deep groove surface 6, and the island-shaped rails 10a and 10b constitute a slider with a two-step configuration, it is also referred to as a shallow dual step sub ambient slider.

In the manufacturing process of the thin film magnetic head as well, during lapping of the disk-facing surface 3, a pole tip recession is produced between the surface of a substrate and the surface of the protective layer that protects the head element portion 7, so that the magnetic spacing increases by the amount of the pole tip recession.

Then, in order to reduce the magnetic spacing, it was conceived that by using the technique described in JP-A-2001-236619, the surface of the substrate on the center rail flying surface 4a is also made to be the center rail shallow groove surface 5a and only a small region including the head element portion 7 is made to be the center rail flying surface 4a.

However, this brings about a change in the proportions of the center rail flying surface 4a and the center rail shallow groove surface 5a in the disk-facing surface, thereby producing variations in the flying height. A desired flying height cannot be thereby obtained consistently.

The object of the present invention is therefore to solve the problems described above and to provide a thin film magnetic head that has a configuration of a shallow dual step sub ambient slider and can reduce a pole tip recession, thereby allowing an improvement in magnetic spacing.

SUMMARY OF THE INVENTION

In order to achieve this object, in a thin film magnetic head according to the present invention, a head element portion including a write head element and a read head element is provided over a substrate through base alumina. A center rail protruding from a deep groove surface in the form of an island is provided in the center of the air outflow end of a disk-facing surface including the surface of the substrate and the surface of the head element portion. An air inflow end rail protruding from the deep groove surface in the form of an island is provided at the air inflow end of the disk-facing surface. Each of the center rail and the air inflow rail includes a shallow groove surface protruding from the deep groove surface by a predetermined height and an air bearing surface protruding from the shallow groove surface by a predetermined height. The surface of the head element portion is included in the air bearing surface of the center rail.

Then, it is so arranged that the air bearing surface of the center rail includes the surface of the head element portion and is positioned outside the surface of the substrate, at least one super shallow groove surface having a recession from the air bearing surface smaller than a recession to the shallow groove surface is provided between the air bearing surface and the shallow groove surface, and the disk-facing surface is of an n-step configuration, where n being an integer equal to or more than three.

Further, a boundary between the air bearing surface and the super shallow groove surface of the center rail is positioned on the base alumina between the head element portion and the substrate, and an air bearing surface overcoat is provided over the air bearing surface of the center rail.

Alternatively, in the present invention, the air bearing surface overcoat is provided over a region of the air bearing surface of the center rail, the region including the surface of the head element portion, and the boundary of the air bearing surface overcoat is positioned on the base alumina between the head element portion and the substrate. Then, it is so arranged that the surface of the air bearing surface overcoat at least formed on the base alumina protrudes from the surface of the substrate.

With this arrangement, a reduction in the flying height becomes possible. Further, even if the disk-facing surface has been inclined or swayed, the air bearing surface is brought into contact with the surface of the disk. The magnetic head or the surface of the disk can be thereby prevented from being damaged.

Other objects, features and advantages of the invention will become apparent from the following description of the embodiments of the invention taken in conjunction with the accompanying drawings.

BRIEF DESCRIPTION OF THE DRAWINGS

FIGS. 10A and 10B are flowcharts showing a manufacturing process of the thin film magnetic head according to the first embodiment illustrated in FIGS. 6 to 9 and a manufacturing process of the thin film magnetic head illustrated in FIGS. 2 to 5 for comparison;

FIG. 11 is a table showing results of measurement using an AFM on pole tip recessions of the head according to the first embodiment illustrated in FIGS. 6 to 9 and the head for comparison;

FIG. 15 is a table showing results of measurement of pole tip recessions using the AFM on the head according to the second embodiment illustrated in FIGS. 12 and 13 and the head for comparison;

DETAILED DESCRIPTION OF THE EMBODIMENTS

First, an overview of the present invention will be described.

Figure 1:
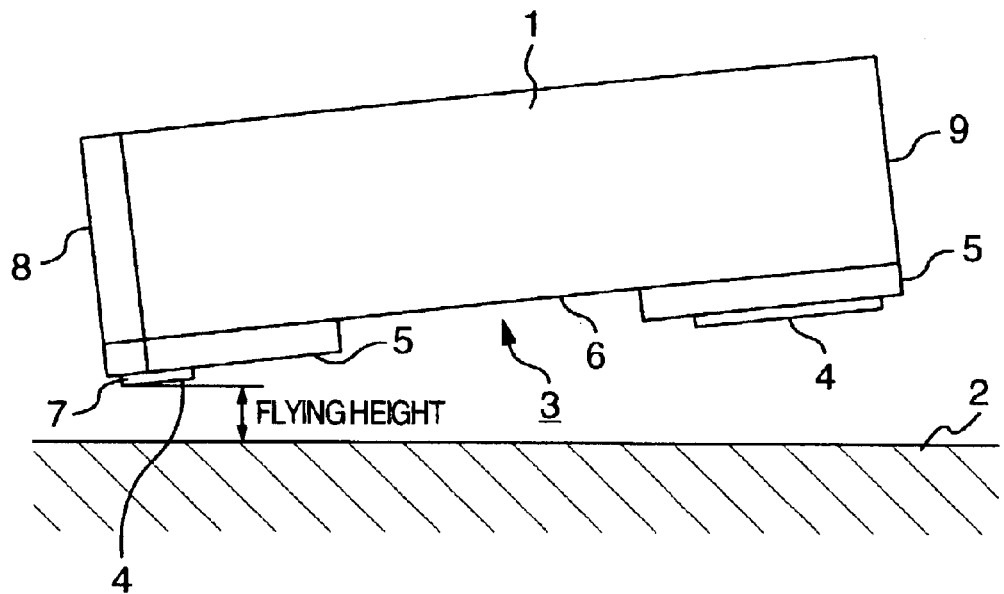
FIG. 1 is a diagram schematically illustrating a positional relationship between a thin film magnetic head and a disk during operation of a magnetic disk drive.

FIG. 1 is a diagram schematically showing a positional relationship between a thin film magnetic head and a disk during operation of a magnetic disk drive. Reference numeral 1 denotes the thin film magnetic head (slider), reference numeral 2 denotes the disk, reference numeral 3 denotes a disk-facing surface, reference numeral 4 denotes air bearing surfaces, reference numeral 5 denotes shallow groove surfaces, reference numeral 6 denotes a deep groove surface, and reference numeral 7 denotes a head element portion.

As shown in FIG. 1, the magnetic disk drive utilizes a dynamic pressure resulting from rotation of the disk 2, which is a magnetic recording medium. The thin film magnetic head 1 is thereby made to fly from the surface of the disk 2 by a minute distance. Data recording and reproduction are then performed by the head element portion 7 which includes a write head element and an MR element, formed at the end of the slider 1. A gap when the thin film magnetic head is most close to the surface of the disk 2 is referred to as a flying height.

In recent years, there is a tremendous trend toward magnetic disk drives with higher recording density. In order to cope with this trend, the flying height of the thin film magnetic head is more and more reduced year after year. The flying height has currently reached 10 to 20 nm.

As one of the reasons why a reduction in the flying height of the thin film magnetic head has become possible, development of a shallow dual step sub ambient slider can be pointed out. In this head, the disk-facing surface 3 of the thin film magnetic head 1 is formed to have a two-step surface constituted by the air bearing surfaces 4 and the shallow groove surfaces 5, and a deep groove surface 6. Portions that include the air bearing surfaces 4 and the shallow groove surfaces 5 constitute island-like rails for the shallow groove surface 6. With this arrangement, a negative pressure is generated between the disk-facing surface 3 and the surface of the disk 2, thereby causing the slider 1 to fly from the surface of the disk 2 by a minute distance. The flying height can be adjusted according to the sizes, shapes, and heights of the island-shaped rails.

Figure 2:
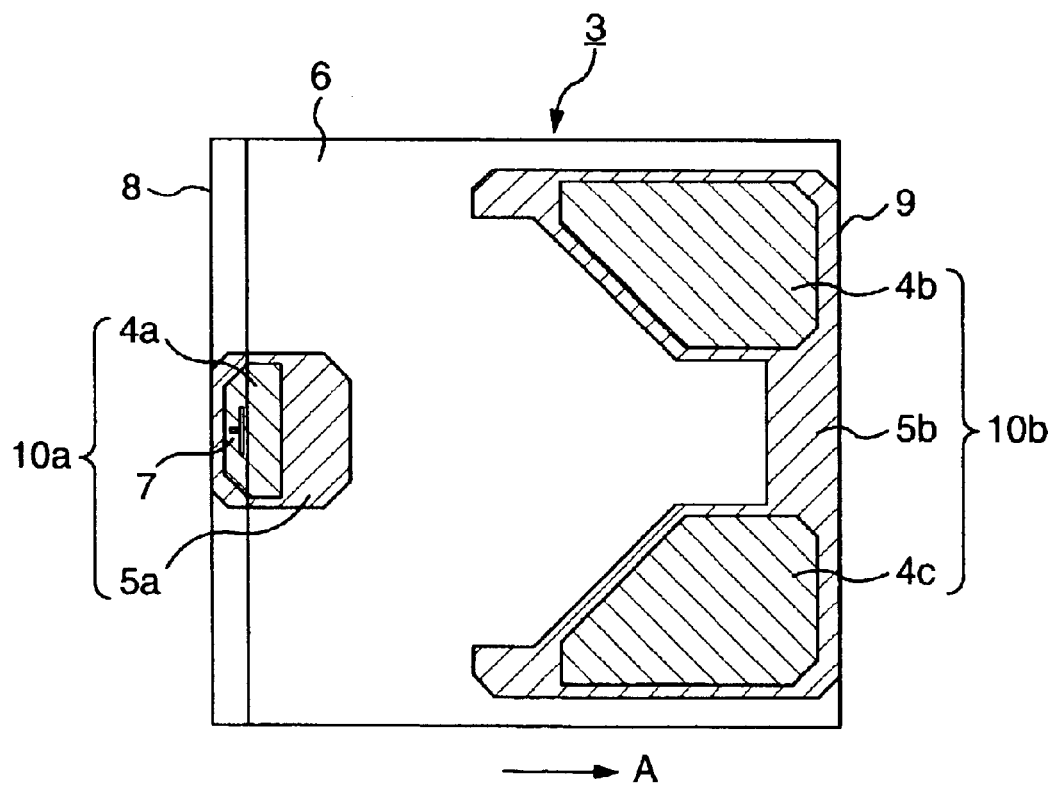
FIG. 2 is a top view illustrating a configuration of a disk-facing surface of a shallow dual step sub ambient slider.

FIG. 2 is a top view showing the shallow dual step sub ambient slider, which is a basic configuration of a thin film magnetic head according to the present invention. FIG. 2 shows a configuration of the disk-facing surface 3 of the thin film magnetic head illustrated in FIG. 1. Reference numeral 4a denotes a center rail flying surface, reference numerals 4b and 4c denote air inflow end rail flying surfaces, numeral 5a denotes a center rail shallow groove surface, reference numeral 5b denotes an air inflow end rail shallow groove surface, reference numeral 8 denotes an air outflow end, reference numeral 9 denotes an air inflow end, reference numeral 10a denotes a center rail, and reference numeral 10b denotes an air inflow rail. Components that correspond to those in FIG. 1 are designated by like reference numerals and characters.

Referring to FIG. 2, the disk-facing surface 3 has two types of grooves formed: a shallow groove and a deep groove. The shallow groove is provided as an intermediate groove, thereby forming a two-step configuration. With this arrangement, the island-like rail or the center rail 10a that includes the center rail flying surface 4a and the center rail shallow groove surface 5a is formed. In this configuration, an arrow A direction is regarded as the direction in which the thin film magnetic head 1 moves with respect to the disk 2 in FIG. 1. On the center rail flying surface 4a, the head element portion 7 is exposed in the center of the air outflow end 8, while the center rail shallow groove surface 5a is processed to have a predetermined depth. The air inflow end rail 10b, which is an island-shaped rail, is formed along the air inflow end 9 on the opposite side of the center rail 10a.

The air inflow end rail 10b includes the air inflow end rail shallow groove surface 5b, and the air inflow end rail flying surfaces 4b and 4c. The air inflow end rail shallow groove surface 5b is substantially aligned with the entire air inflow end 9. The air inflow end rail flying surfaces 4b and 4c are formed at both ends of the air inflow end rail shallow groove surface 5b or the air inflow end 9. A region in the disk-facing surface 3 other than the center rail 10a and the air inflow end rail 10b constitutes the deep shallow surface 6.

The air bearing surfaces 4a to 4c, which will be hereinafter referred to as the air bearing surfaces 4, are all in the same plane. The shallow groove surfaces 5a and 5b, which will be referred to as the shallow groove surfaces 5, are processed to have a depth of 100 to 200 nm from the air bearing surfaces 4, while the deep groove surface 6 is processed to have a depth of 0.5 to 2.0 μm from the air bearing surfaces 4. Then, a negative pressure in accordance with the shapes of the island-shaped rails 10a and 10b and the depths of the processed surfaces 5 and 6 (or the grooves) is generated between the thin film magnetic head 1 and the disk 2. In view of this fact, by adjusting this negative pressure according to the shapes of the island-shaped rails 10a and 10b and the depths of the processed surfaces 5 and 6 (or the grooves), the flying height of the thin film magnetic head 1 relative to the disk 2 is controlled.

Figure 3:
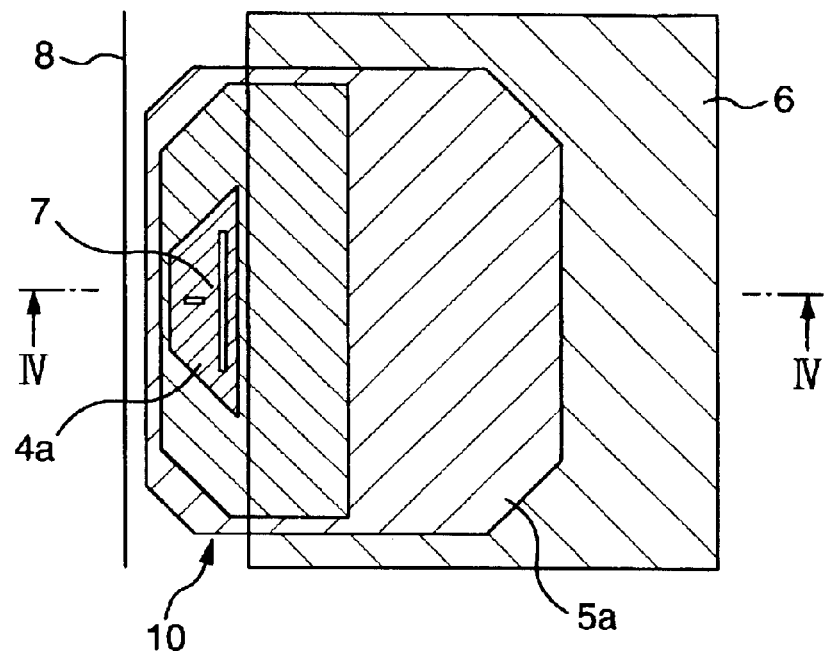
FIG. 3 is an enlarged top view of a center rail illustrated in FIG. 2.
Figure 4:
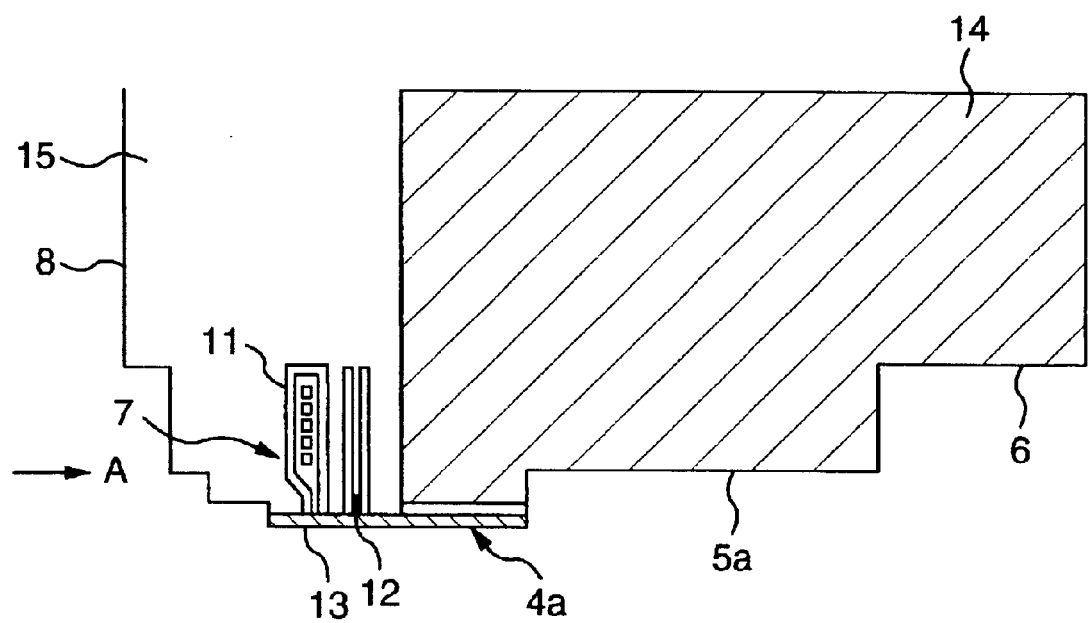
FIG. 4 is a cross sectional view shown by the arrows IV—IV in FIG. 3.

FIG. 3 is an enlarged top view of the center rail 10a illustrated in FIG. 2, and FIG. 4 is a cross sectional view shown by the arrows IV—IV in FIG. 3. Reference numeral 11 denotes a write head element (inductive magnetic head element), reference numeral 12 denotes an MR head element (magneto-resistance effect type head element), reference numeral 13 denotes an air bearing surface overcoat, reference numeral 14 denotes a substrate member, and reference numeral 15 denotes an alumina overcoat. Components which correspond to those in the drawings described before are designated by like reference numerals and characters.

As shown in FIGS. 3 and 4, the head element portion 7 that includes the write head element 11 and the read head element 12 is formed on a surface portion of the substrate 14. The alumina overcoat 15 is provided to cover the head element portion 7, and the end of the alumina overcoat constitutes the air outflow end 8. Then, by lapping the slider having the head element portion 7 and the alumina overcoat 15 formed over the substrate 14 so as to expose the leading end of the head element portion 7, the center rail flying surface 4a is formed. Further, by lapping the substrate 14, the center rail shallow groove surface 5a having the predetermined depth from the center rail flying surface 4a and then the deep shallow groove surface 6 are formed, respectively.

On the head element portion 7, the write head element 11 and the read head element 12 are disposed in the direction of movement of the thin film magnetic head 1, shown by the arrow A. The leading end of the head element portion 7 exposed at the center rail flying surface 4a is covered with the air bearing surface overcoat 13 for protection.

Figure 5:
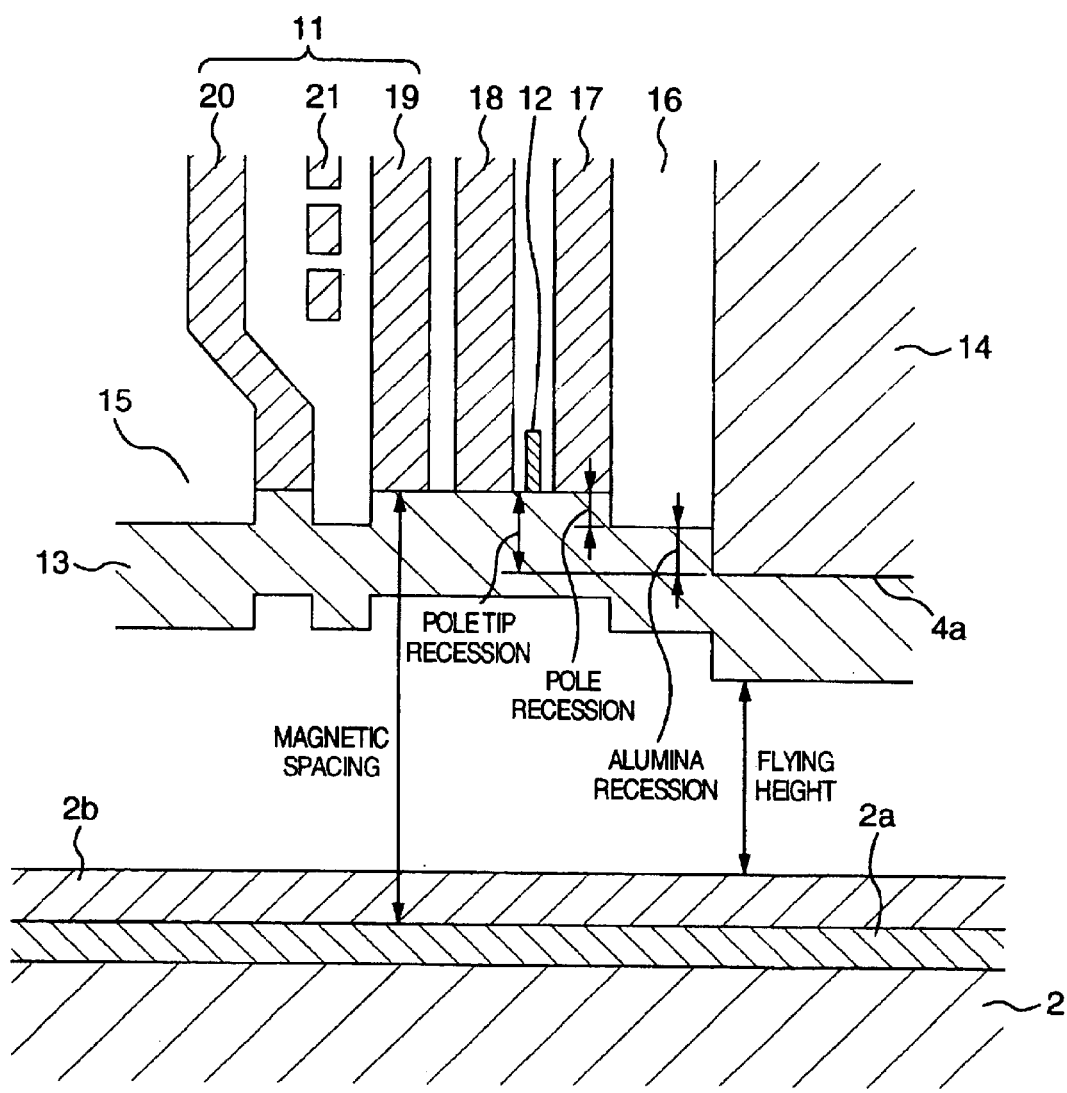
FIG. 5 is a cross sectional view illustrating a conventional, common configuration of a head element portion of the thin film magnetic head.

A conventional, common configuration of the head element portion 7 of the thin film magnetic head will be described with reference to FIG. 5. FIG. 5 is a sectional view showing the head element portion 7 together with the disk 2. Referring to FIG. 5, reference numeral 2a denotes a magnetic film, reference numeral 2b denotes a protective film, reference numeral 16 denotes base alumina (insulation film), reference numeral 17 denotes a lower shield layer, reference numeral 18 denotes an upper shield layer, reference numeral 19 denotes a lower pole, reference numeral 20 denotes an upper pole, and reference numeral 21 denotes a coil. Components that correspond to those in FIGS. 3 and 4 are designated by like reference numerals and characters.

Referring to FIG. 5, the base alumina 16 is provided on the substrate 14 made of a hard ceramic such as $Al_2O_3$—TiC or SiC in the form of the insulation film. Over the base alumina 16, the read head element 12 is sandwiched between the lower shield layer 17 and the upper shield layer 18 provided to reduce noise during reproduction. The write head element 11 is disposed over the upper shield layer 18.

The head element portion 7 as configured above is covered with the alumina overcoat 15 that serves as an insulation layer, and the end of the alumina overcoat 15 constitutes the air outflow end 8 (as shown in FIGS. 3 and 4). The leading end that includes the write head element 11 and the read head element, exposed through lapping for forming the air bearing surface is covered with the air bearing surface overcoat 13 for protection.

The write head element 11 includes the upper pole 20, lower pole 19, and coil 21 embedded in an insulation layer formed therebetween, not shown. In the write head element 11, when a data signal is supplied to the coil 21, a resulting magnetic flux leaks from the leading ends of the upper pole 20 and the lower pole 19. Then, the leaked magnetic flux magnetizes the magnetic film 2a protected by the protective film 2b on the rotating disk 2, thereby performing magnetic recording onto the disk 2.

In the read head element 12, according to the strength of a magnetic field caused by S and N magnetic poles formed on the magnetic film 2a on the disk 2, resulting from the magnetic recording described above, the resistance of the MR element changes. Accordingly, the resistance of the MR element changes according to data written on the magnetic film 2a on the disk 2. Thus, by rotating the disk 2 to move the read head element 12 relative to the disk 2 and detecting a change in the resistance, the data recorded on the disk 2 can be reproduced.

The MR head element 12 of a type that exposes the MR element at the air bearing surface has a higher MR ratio and exhibits better characteristics. For this reason, by lapping the air bearing surface, the leading end of the MR element is exposed for a finish.

The head element portion 7 to be processed during processing of the center rail flying surface is made of composite materials in which a plurality of materials having different processability are intermingled; the upper pole 20 and the lower pole 19 of the write head element 11, the upper shield layer 18, the lower shield layer 17, and the MR element of the read head element 12 are made of soft metals. The base alumina 16 and the alumina overcoat 15 exhibit comparatively good processability, while the substrate 14 is made of $Al_2O_3$—TiC or SiC that has a high hardness and exhibits comparatively poor processability.

When forming the center rail flying surface 4a (as shown in FIGS. 3 and 4) by lapping a surface that includes the head element portion 7 made of such composite materials, processability differences among the materials will produce recessions in the head element portions 7 on the center rail flying surface 4a.

As shown in FIG. 5, the lapped surface of the substrate 14 after lapped becomes the center rail flying surface 4a. The lapped surfaces of the base alumina 16, the insulation layer for the write head element 11, the alumina overcoat 15 are recessed from the center rail flying surface 4a, thereby producing a recession of these lapped surfaces. This recession is an alumina recession. Further, with respect to the lapped surfaces of the base alumina 16, the insulation layer for the write head element 11, and the alumina overcoat 15 as well, the lapped surfaces of the upper pole 20 and the lower pole 19 of the write head element 11, the upper shield layer 18, the lower shield layer 17, and the MR element of the read head element 12, made of soft metals are recessed, thereby producing a recession of the lapped surfaces. This is a pole recession. A pole tip recession therefore becomes the sum of the alumina recession and the pole recession.

The air bearing surface overcoat 13 made of a film such as a diamond-like carbon (DLC) film is formed over the lapped surfaces. The magnetic film 2a, onto which actual recording is performed, is formed on the substrate surface of the disk 2, and the protective film is further formed thereon.

As shown in FIG. 1, the thin film magnetic head 1 during recording or reproduction by the magnetic disk drive is inclined, with the air inflow end 9 thereof being higher and the air outflow end 8 thereof being lower. While flying from the disk 2, the thin film magnetic head 1 is in the lowest position near the head element portion 7 on the center rail flying surface 4.

The flying height defined by the minimum clearance between the thin film magnetic head 1 and the disk 2 is a gap in this lowest position of the thin film magnetic head 1. Referring to the thin film magnetic head illustrated in FIG. 5, the flying height of the head refers to the distance between the surface of the most protruding portion of the air bearing surface overcoat 13 facing the substrate 14 and the surface of the facing protective film 2b of the disk 2.

The spacing between the head element portion 7 and the disk 2, related to actual recording and reproduction, or magnetic spacing is defined by the distance from the lapped surfaces of the upper pole 20 and the lower pole 19 of the write head element 11 and the MR element of the read head element 12 to the magnetic film 2a of the disk 2. Accordingly, the magnetic spacing is given by five elements as follows:

Magnetic Spacing=Film Thickness of the Protective Film 2b of the Disk 2+Flying Height+Film Thickness of the Air Bearing Surface Overcoat 13+Alumina Recession+Pole Recession In order to achieve a high areal density, there is a need to narrow the magnetic spacing, which has become one of the most important issues for the magnetic disk drive. It is not too much to say that the history of technological development of the magnetic head is the history of reduction in the magnetic spacing. Various technologies have been developed so far to aim at reductions in the five elements. Among the five elements, the alumina recession and the pole recession greatly vary according to a condition of lapping of the air bearing surface. In order to reduce these recessions, the lapping condition is optimized. Under present circumstances, the alumina recession can be reduced to 2.5 nm, the pole recession can be reduced to 0.5 nm. Accordingly, establishment of the lapping condition in which the pole tip recession can be reduced to approximately 3 nm has become possible.

However, from now on, too, a further improvement in the areal density is requested. In order to achieve this purpose, further narrowing of the magnetic spacing is essential, and in view of this requirement, a further reduction in the pole tip recession is also required.

The present invention has been made to fulfill the requests, and is basically configured as shown in FIGS. 1 to 4. According to the present invention, by changing the shape of the air bearing surface and eliminating the alumina recession, the pole tip recession is greatly reduced, thereby greatly reducing the magnetic spacing.

In order to achieve the high disk areal density as described above, narrowing of the magnetic spacing is essential. Then, in order to narrow the magnetic spacing, a reduction in the pole tip recession constituted by the alumina recession and the pole recession is required. If a comparison is made between the alumina recession and the pole recession, it is found that the alumina recession is about four to five times as large as the pole recession. Thus, if the alumina recession can be reduced, a great reduction in the pole tip recession becomes possible.

The following methods can be conceived as a method of reducing the alumina recession:

(1) a method of changing materials for the substrate 14 and the base alumina 16 illustrated in FIG. 5 to change their processability, thereby reducing the alumina recession;
(2) a method of optimizing the lapping condition, thereby reducing the alumina recession;

In the method (1) of changing the materials, if this change is made, the flying characteristics of the thin-film magnetic head and the processes for formation and processing of elements would be greatly affected. Accordingly, this method is difficult to adopt. Further, at present, $Al_2O_3$—TiC is commonly used for the substrate 14. However, in order to improve the surface roughness of the substrate 14, SiC is sometimes employed. SiC, however, is worse than $Al_2O_3$—TiC in processability. Thus, if SiC is employed for the substrate 14, an increase in the alumina recession would occur to the contrary.

In the method (2) of optimizing the lapping condition, optimization of chemical elements and minimization of a lapping amount per abrasive particle were studied. However, this method is approaching the limit of its usefulness, so that it is also difficult to greatly reduce the alumina recession.

The present invention has therefore been made to modify the structures of the island-like rails formed in the disk-facing surface to prevent the alumina recession from being produced, thereby greatly reducing the pole tip recession.

Now, the embodiments of the present invention will be described below with reference to the appended drawings.

In the shallow dual step sub ambient slider described with reference to FIGS. 2 to 5, the center rail flying surface 4a at which the write head element and the read head element are exposed includes the substrate 14, the base alumina 16, the lower shield layer 17, the upper shield layer 18, the MR head element 12, and the upper pole 20 and lower pole 19 of the write head element 11. Thus, if the air bearing surface is lapped, the alumina recession and the pole recession are produced. Whereas, if the substrate 14 is not included in the center rail flying surface 4a, the cause of the alumina recession is eliminated. Thus, no alumina recession is produced.

Figure 6:
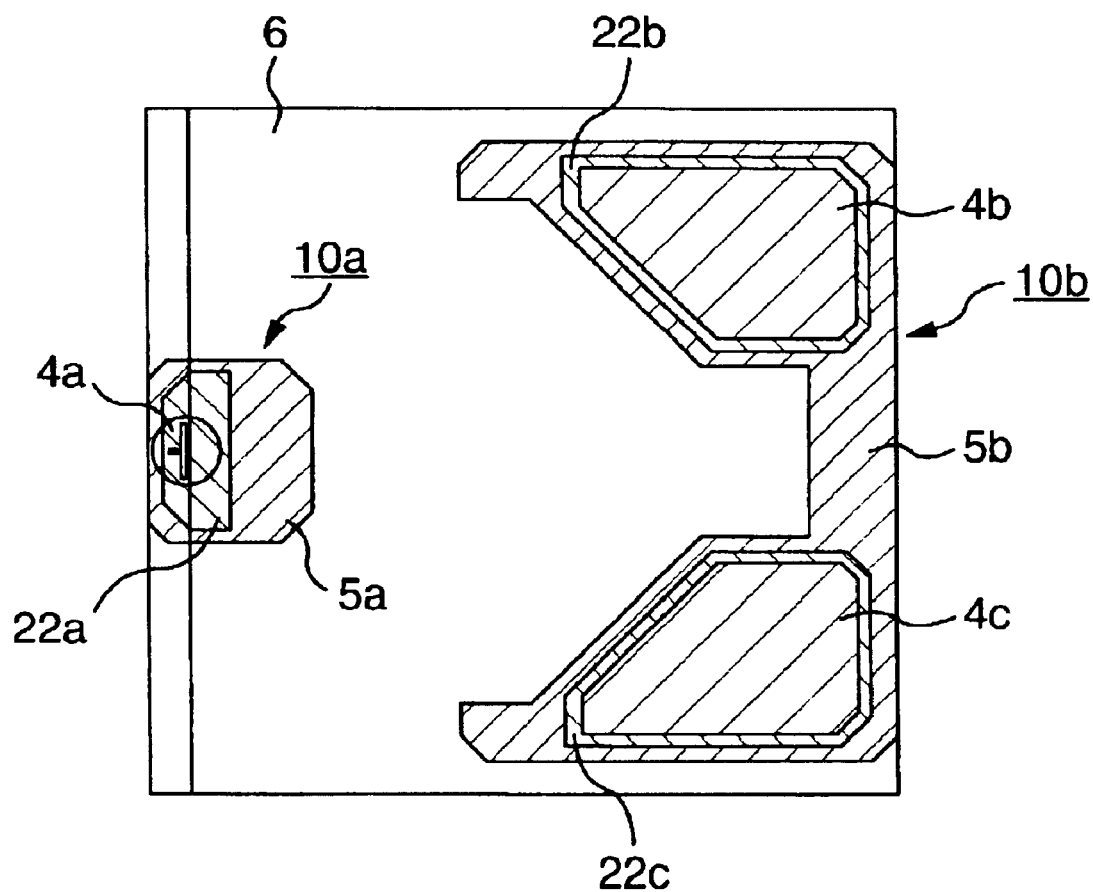
FIG. 6 is a top view illustrating a disk-facing surface of a thin film magnetic head according to a first embodiment of the present invention, which is a pertinent part of the head.

FIG. 6 is a top view showing the disk-facing surface, which is the pertinent part of a thin film magnetic head according to a first embodiment of the present invention. Reference numerals 22a to 22c denote super shallow groove surfaces. Components that correspond to those in FIGS. 2 and 5 are designated by like reference numerals and characters, thereby omitting their repeated descriptions.

Referring to FIG. 6, the first embodiment is the same as that described with reference to FIGS. 2 to 5. Nevertheless, the island-shaped rails 10a and 10b, in particular, are configured as follows:
(1) Super shallow groove surfaces 22a, 22b, and 22c are provided between the rail flying surfaces 4 and the shallow groove surfaces 5, respectively, thereby making a three-step configuration.
(2) It is arranged that the substrate 14 is excluded from the center rail flying surface 4a at which the head element portion 7 is exposed, so that the area of the center rail flying surface 4a that includes the write head element 11 and the MR head element 12 is minimized.
(3) The edge of the center rail flying surface 4a is positioned on the base alumina 16, rather than on the substrate 14.
(4) The super shallow groove surface 22a is formed outside the center rail flying surface 4a, with the recession of the super shallow groove surface 22a from the center rail flying surface 4a equal to or more than 3 nm.

Figure 7:
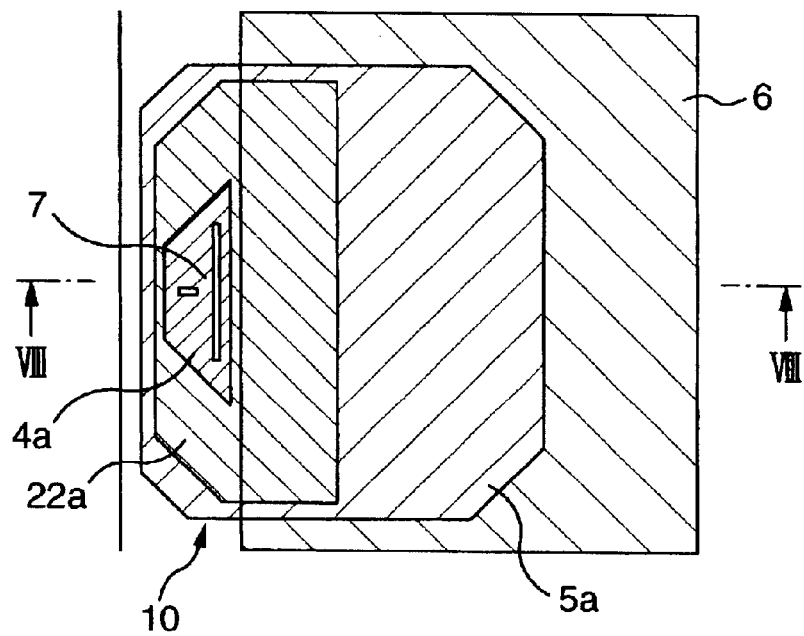
FIG. 7 is an enlarged top view of a center rail illustrated in FIG. 6.

FIG. 7 is an enlarged top view showing the center rail 10a illustrated in FIG. 6. Components that correspond to those in FIG. 6 are designated by like reference numerals and characters.

Referring to FIG. 7, the area of the center rail flying surface 4a with the head element portion 7 is made to be small. Around the center rail flying surface 4a, the super shallow groove surface 22a with a recession less than that of the center rail shallow surface 5a is formed. The outside of the super shallow groove surface 22a constitutes the center rail shallow groove surface 5a. The outside of the center rail shallow groove surface 5a constitutes the deep groove surface 6.

Figure 8:
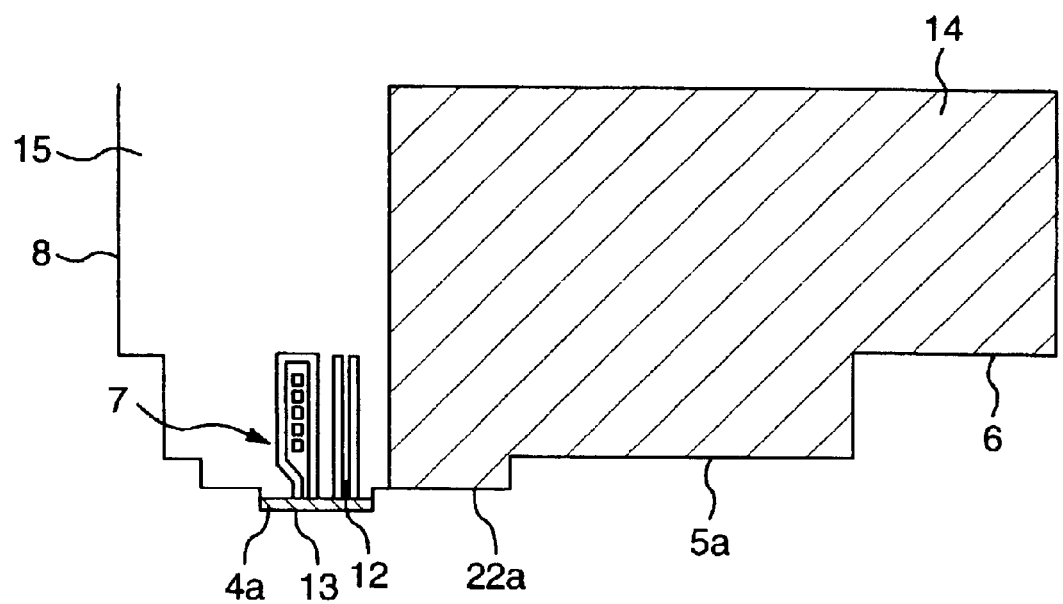
FIG. 8 is a cross sectional view shown by the across VIII—VIII in FIG. 7.

FIG. 8 is a cross sectional view shown by the arrows VIII—VIII in FIG. 7. As illustrated in FIG. 8 and also in FIG. 7, the edge or boundary of the center rail flying surface 4a is not positioned on the substrate 14. The center rail flying surface 4a does not include any surface of the substrate 14.

Figure 9:
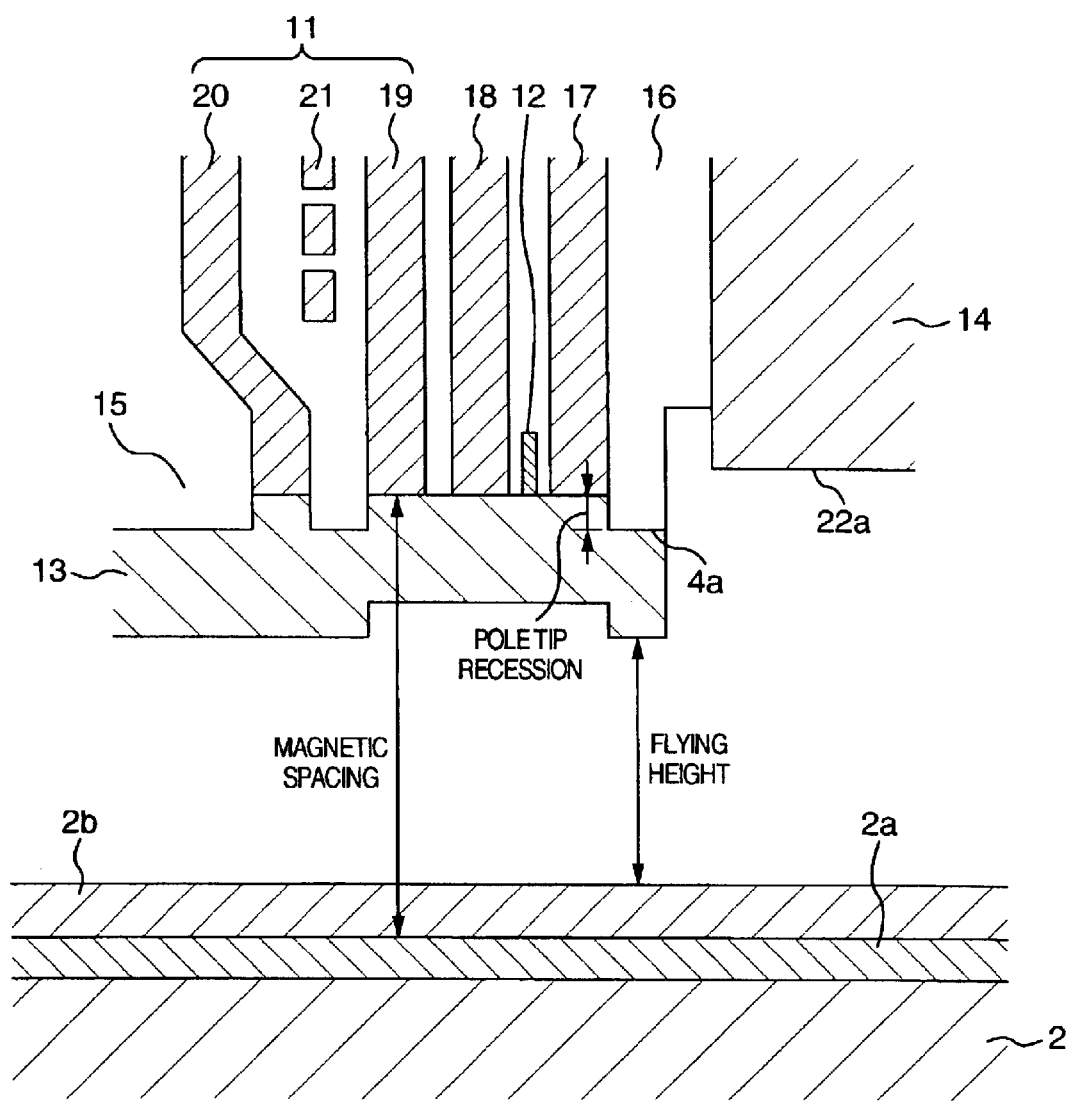
FIG. 9 is an enlarged top view of a head element portion illustrated in FIG. 8.

FIG. 9 is an enlarged sectional view of the head element portion 7 illustrated in FIG. 8. Components that correspond to those in FIGS. 5 to 8 are designated by like reference numerals and characters, thereby omitting their repeated descriptions.

Referring to FIG. 9, in this first embodiment, the center rail flying surface 4a is formed to the location of the base alumina between the substrate 14 and the lower shield layer 17 of the head element portion 7. The lapped surfaces of the substrate 14 and part of the base alumina 16 are recessed from the remainder of the lapped surface of the base alumina 16.

With this arrangement, the remainder of the lapped surface of the base alumina 16 and the lapped surfaces of the insulation layer for the write head element 11 and the alumina overcoat 15 protrude to the disk 2 most closely, thereby defining the center rail flying surface 4a.

Accordingly, the edge or boundary of the center rail flying surface 4a is positioned on the base alumina 16, so that the substrate 14 is not included in the region of the center rail flying surface 4a. It means that the substrate 14 is recessed from the center rail flying surface 4a by a predetermined recession, thus forming the super shallow groove surface 22a.

Due to the configuration of the center rail 10a, part of the lapped surface of the base alumina 16 becomes the center rail flying surface 4a. Though there exists a recession between the lapped surface of the base alumina 16 and the lapped surface of the substrate 14, the alumina recession that will exert an influence on the magnetic spacing, like the alumina recession between the substrate 14 and the base alumina 16 as illustrated in FIG. 5 will not be produced.

In this embodiment, the pole tip recession that influences the magnetic spacing is defined as the pole recession, which is the recession of the lapped surfaces of the MR head element 12 and the upper pole 20 and the lower pole 19 of the write element 11 from the center rail flying surface 4a. Thus, the relation in which the pole tip recession is equal to the pole recession holds. In this manner, the pole tip recession can be greatly reduced. Consequently, the magnetic spacing can also be reduced greatly.

If only exclusion of the substrate 14 from the center rail flying surface 4a is intended, the super shallow groove lapped surface 22a in FIG. 7 as well should be the center rail shallow groove surface 5a. In other words, in the center rail 10a of the shallow dual step sub ambient slider illustrated in FIGS. 3 and 4, the center rail shallow groove surface 5a should be expanded to the entire substrate 14.

However, if the area of the center rail flying surface 4a is reduced with such a two-step configuration, the following problem is encountered. The two-step configuration illustrated in FIGS. 2 to 5 allows the flying height of the thin film magnetic head to be reduced consistently and greatly. On contrast therewith, if the area of the center rail flying surface 4*a* is extremely reduced with the two-step configuration maintained, variations in the flying height will increase, so that a desired, constant flying height cannot be obtained.

In this first embodiment, the area of the center rail flying surface 4*a* is reduced. In addition, the super shallow groove surface 22*a* with a small recession is provided between the center rail flying surface 4*a* and the center rail shallow groove surface 5*a*, thereby making a three-step configuration. With this arrangement, the first embodiment can maintain the effect similar to the effect of the two-step configuration illustrated in FIGS. 2 to 5. In this embodiment, the depth of the super shallow groove surface 22*a* from the center rail flying surface 4*a* should be set to be equal to or larger than 3 nm as described above. It should be set to the minimum required depth.

As described above, this first embodiment can reduce the magnetic spacing more greatly than the shallow dual step sub ambient slider illustrated in FIGS. 2 to 5, while greatly reducing the flying height like the sub ambient slider. For this reason, recording/reproduction characteristics will be greatly improved.

The area of the center rail flying surface 4*a* according to the first embodiment is much smaller than that for the shallow dual step sub ambient slider illustrated in FIGS. 2 to 5. Thus, in this embodiment, while the magnetic disk drive is used, even if a rotational runout has occurred with respect to the center axis on the arrows VIII—VIII in FIG. 7, contact between the center rail flying surface 4*a* and the disk 2 can also be prevented.

FIGS. 10A and 10B are flowcharts showing the manufacturing process of the thin film magnetic head according to the first embodiment and the manufacturing process of the thin film magnetic head illustrated in FIGS. 2 to 5, for comparison. FIG. 10A shows the manufacturing process of the thin film magnetic head illustrated in FIGS. 2 to 5, while FIG. 10B shows the manufacturing process of the thin film magnetic head according to the first embodiment.

First, the manufacturing process of the thin film magnetic head illustrated in FIGS. 2 to 5 will be described with reference to FIG. 10A.

(1) Element formation (Step 100): The read head element 12 and the write head element 11 are formed over the wafer of the substrate 14 made of $Al_2O_3$—TiC or SiC using thin film processing represented by lithography.

(2) Substrate cutting (Step 101): The wafer is cut into row bars by means of slicing that uses a diamond grindstone.

(3) Double side lapping (Step 102): By means of double side lapping that uses upper and lower lapping plates, a row bar is sandwiched between the two lapping plates for lapping its both surfaces. This process alleviates a processing deformation that will appear in the row bar when the row bar is cut from the wafer, thereby eliminating the swell or warp of the row bar.

(4) Air bearing surface lapping (Step 103): The air bearing surface of the row bar is lapped to perform control over the height and dimensions of the MR element, improve the surface roughness thereof, and reduce the pole tip recession.

(5) Air bearing surface overcoat formation (Step 104): In order to prevent corrosion of the read and write elements and improve abrasion resistance to contact with the disk 2, the air bearing surface overcoat 13 made of diamond-like carbon (DLC) is formed over the lapped air bearing surface. The film thickness of the air bearing surface overcoat 13 at this time is set to 4 to 10 nm.

(6) Shallow groove formation (Step 105): The air bearing surface is processed by ion milling to form a shallow groove surface. The recession of the shallow groove surface from the air bearing surface at this time is set to approximately 100 to 200 nm.

(7) Deep groove formation (Step 106): The shallow groove surface is processed using Reactive Ion Etching (RIE) to form the deep groove surface 6. The recession of the deep groove surface 6 from the air bearing surface at this time is set to approximately 0.5 to 2.0 $\mu$m.

(8) Chip cutting (Step 107): The air bearing surface 4, shallow groove surface 5, and deep groove surface 6 are obtained by the processes described above. Then, by means of slicing that uses the diamond grindstone, the row bar is cut into sliders.

(9) Completion of sliders (Step 108): By the cutting process in Step 107, shallow dual step sub ambient sliders are completed.

The foregoing description was directed to the manufacturing process of the thin film magnetic head illustrated in FIGS. 2 to 5. On contrast therewith, in the manufacturing process of the thin film magnetic head according to the first embodiment, the step 200 of super shallow groove formation is added between the deep groove formation step 106 and the chip cutting step 107, as shown in FIG. 10B.

In this step 200, the air bearing surface is processed using ion milling to form the super shallow groove surface 22. The recession of the super shallow groove surface 22 from the air bearing surface at this time is set to approximately 3 to 10 nm. The manufacturing process according to the first embodiment is the same as the manufacturing process illustrated in FIG. 10A, except this additional step 200. The step 200 may also be added between the step 104 and the step 105, or between the step 105 and the step 106.

The thin film magnetic head according to the first embodiment and the thin film magnetic head illustrated in FIGS. 2 to 5 for comparison were manufactured on the basis of the manufacturing processes described above, and the pole tip recessions resulting from the processes were measured. The manufacturing conditions were as follows:

(1) Recession of the super shallow groove surface 22 from the air bearing surface 4: 5 nm (2) Recession of the shallow groove surface 5 from the air bearing surface 4: 150 nm (3) Recession of the deep groove surface 6 from the air bearing surface 4: 0.90 $\mu$m (4) Measurement condition and measurement device: Digital Instrument's NanoScope IIIA Measured Surfaces: air bearing surface near the head element portion 7 of each of the heads before formation of the air bearing surface overcoat The number of sliders measured: 20 sliders for each of both the head according to the first embodiment and the head for comparison FIG. 11 shows the results of measurement of the pole tip recessions using an Atomic Force Microscope (AFM). Since the pole tip recession of the air bearing surface 4 is equal to the recession produced from the pole tip recession of the air bearing surface overcoat 13 within a neglibible limit, the recession of the air bearing surface overcoat 13 was measured instead of the pole tip recession of the air bearing surface 4.

According to the results of measurement, in the thin film magnetic head for comparison, the average values of the alumina recession, pole recession, and pole tip recession were 2.51 nm, 0.46 nm, and 2.97 nm, respectively. It can be seen from this result that the pole tip recession of this head is large. On contrast therewith, in the thin film magnetic head according to the first embodiment, the substrate 14 is not included in the center rail flying surface 4a, so that there is no alumina recession that influences the pole tip recession. Thus, it can be seen that the average value of the pole tip recession or the pole recession of the head according to the first embodiment, where part of the lapped surface of the base alumina 16 constitutes the center rail flying surface 4a, has become a very small value of 0.41 nm. In this manner, in the first embodiment, the pole tip recession can be greatly improved, thereby allowing a great reduction in the magnetic spacing.

In the first embodiment, it is arranged that the island-shaped rails 10 have the three-step configuration. If the substrate 14 is not included in the center rail flying surface 4a of the center rail 10a, it can be arranged that the island-shaped rails 10 have a configuration with four or more steps. Alternatively, it may be so arranged that only the center rail 10a has a configuration with three or more steps. Further, the number of steps may be different between the center rail 10a and the air inflow end rail. (For example, it may be so arranged that the center rail 10a has the configuration with three or more steps, and that the air inflow end rail 10b has the two-step configuration. With this arrangement, the structure of the thin magnetic head according to this embodiment becomes more similar to the structure of the thin film magnetic head illustrated in FIGS. 2 to 5, so that variations in the flying height can also be controlled.)

Figure 12:
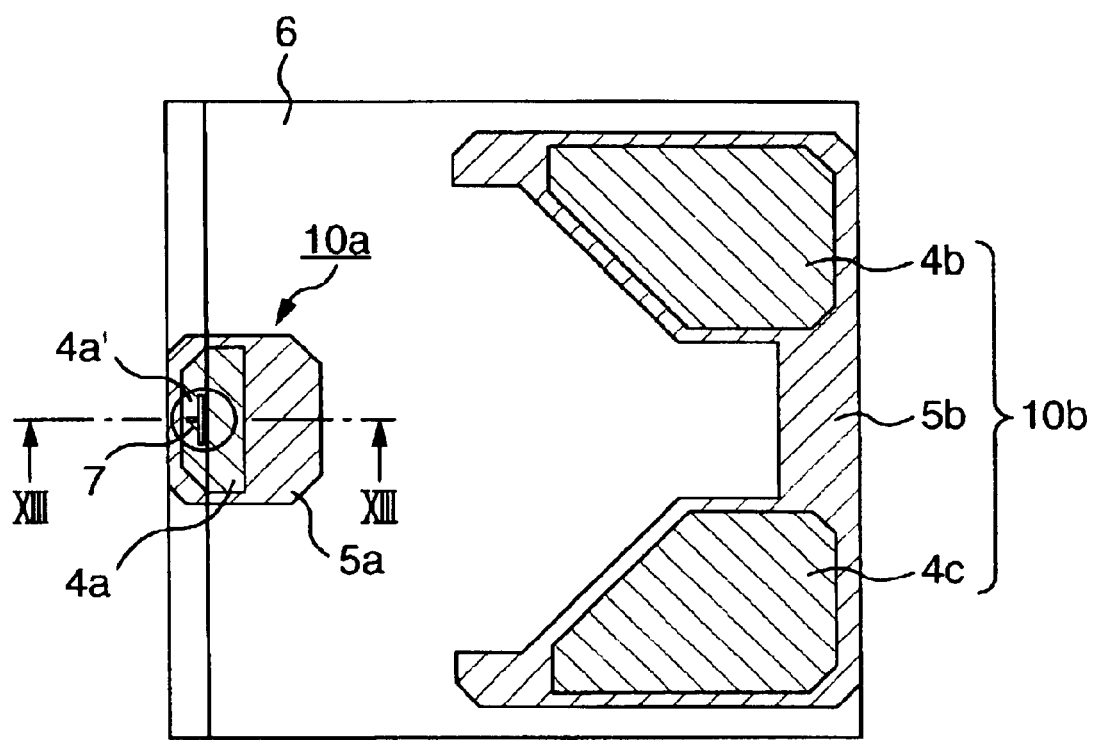
FIG. 12 is a top view illustrating a disk-facing surface of a thin film magnetic head according to a second embodiment of the present invention.

FIG. 12 is a top view showing a disk-facing surface of a thin film magnetic head according to a second embodiment of the present invention. Reference numeral 4a' denotes a substantial center rail flying surface. Components that correspond to those in the drawings described before are designated by like reference numerals and characters, thereby omitting repeated descriptions.

Referring to FIG. 12, the thin film magnetic head according to the second embodiment, like the thin film magnetic head 1 illustrated in FIGS. 2 to 5, has the two-step configuration. In this embodiment, however, the center rail flying surface that influences the magnetic spacing is set to a predetermined surface 4a' of the head element portion 7 rather than the surface 4a of the substrate 14. The surface 4a' is the substantial center rail flying surface. Other configurations are the same as those in the thin film magnetic head 1 illustrated in FIGS. 2 to 5.

Figure 13:
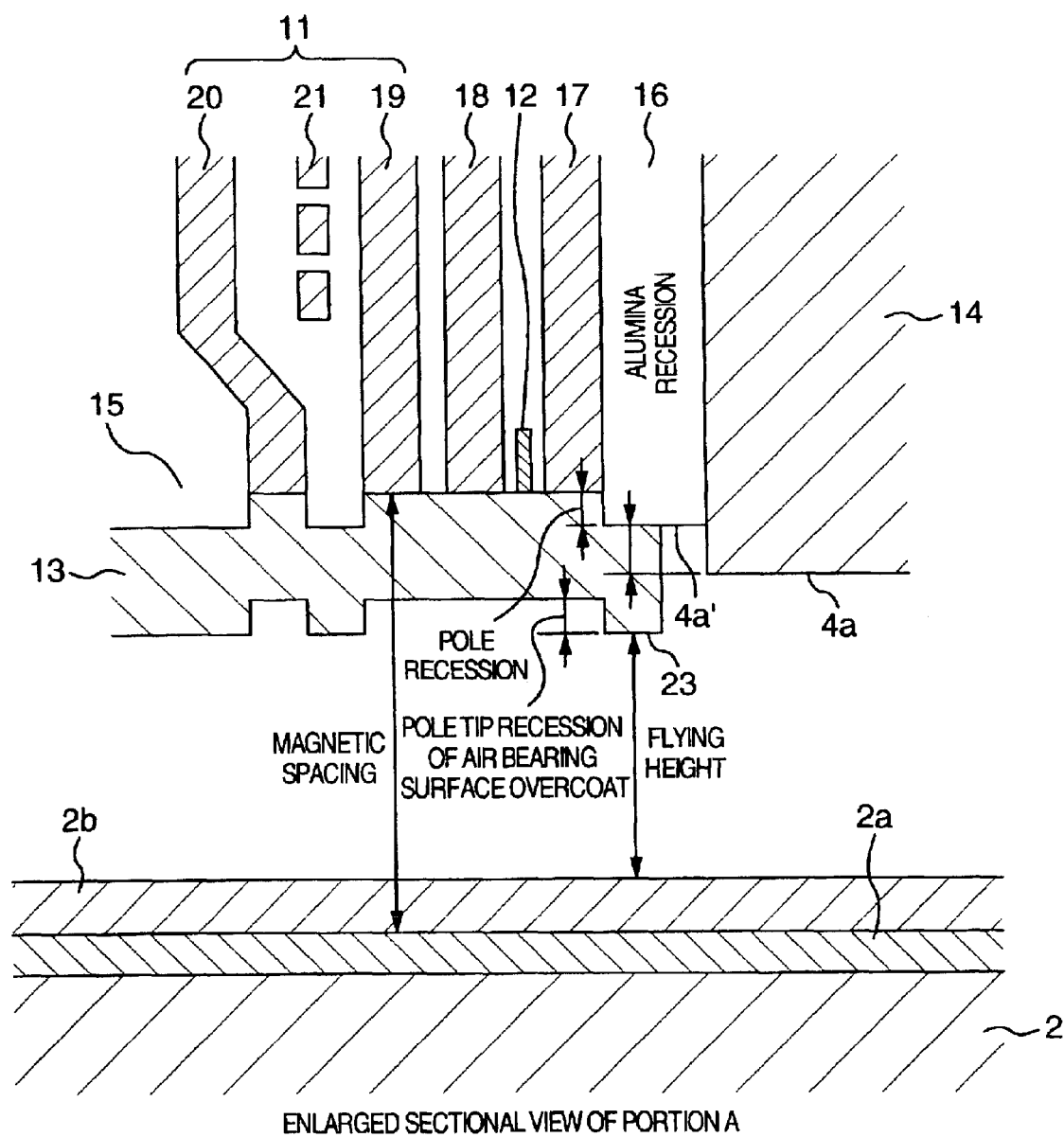
FIG. 13 is an enlarged top view of a head element portion 7 of a center rail shown by the arrows XIII–III in FIG. 12.

FIG. 13 is an enlarged cross sectional view of the head element portion 7 of the center rail 10a shown by the arrows XIII—XIII in FIG. 12. Components that correspond to those in FIGS. 9 and 12 are designated by like reference numerals and characters, thereby omitting their repeated descriptions.

Referring to FIG. 13, the head element portion 7 has the same configuration as the one in FIG. 5, except for the air bearing surface overcoat 13. Accordingly, the center rail flying surface 4a is the lapped surface of the substrate 14.

In this second embodiment, however, the air bearing surface overcoat 13 is formed to the location of the lapped surface of the base alumina 16 of the head element portion 7, and the air bearing surface overcoat 13 is not formed on the lapped surface of the substrate 14. For this reason, the flying height defined as the minimum gap between the thin film magnetic head and the disk 2 becomes the distance between the surface 23 of the air bearing surface overcoat 13 in the portion of the base alumina 16 and the protective film 2b of the disk 2.

The magnetic spacing in this embodiment is defined as the sum of the film thickness of the protective film 2b of the disk 2, flying height, film thickness of the air bearing surface overcoat 13, and pole tip recession. In the case of the thin film magnetic head in FIG. 5, the pole tip recession is defined as the sum of the alumina recession and the pole recession. In this second embodiment illustrated in FIG. 13, even if the alumina recession exists, the pole tip recession is equal to the pole recession, as clear from FIG. 13. Thus, the alumina recession will not influence the magnetic spacing.

As seen from the above description, in this second embodiment as well, the magnetic spacing can be greatly reduced without being influenced by the alumina recession.

In the second embodiment, the area of the air bearing surface overcoat 13 is set to be the minimum area of the head element portion, which includes the write head element 11 and the read head element 12.

In this manner, like the thin film magnetic head illustrated in FIGS. 2 to 5, this second embodiment can reduce the flying height. At the same time, it can greatly reduce the magnetic spacing. Further, though the air bearing surface overcoat 13 is formed over the lapped surfaces of the write head element 11 and the read head element 12, the air bearing surface overcoat 13 is not formed on the lapped surface of the substrate 14 close thereto. Thus, even if the rotational runout has occurred with respect to a center line parallel to the moving direction of the thin film magnetic head, contact between the thin film magnetic head and the disk 2 can be prevented. Thus, the same effect as that in the first embodiment described above can be obtained.

Figure 14A:
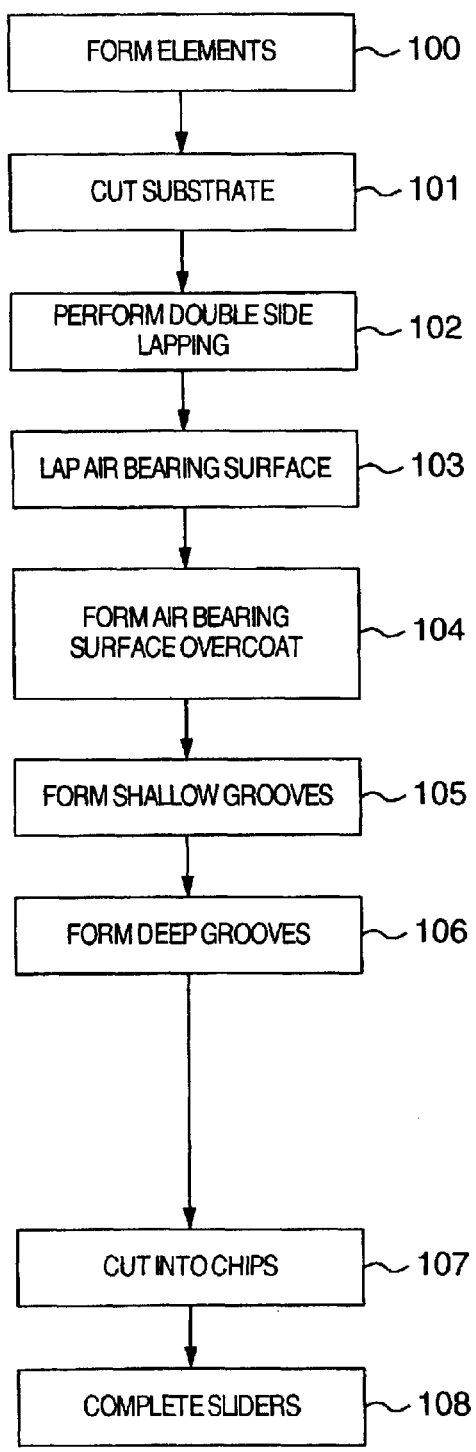
FIGS. 14A and 14B are flowcharts showing a manufacturing process of the thin film magnetic head according to the second embodiment illustrated in FIGS. 12 and 13 and the manufacturing process of the thin film magnetic head illustrated in FIGS. 2 to 5 for comparison.
Figure 14B:
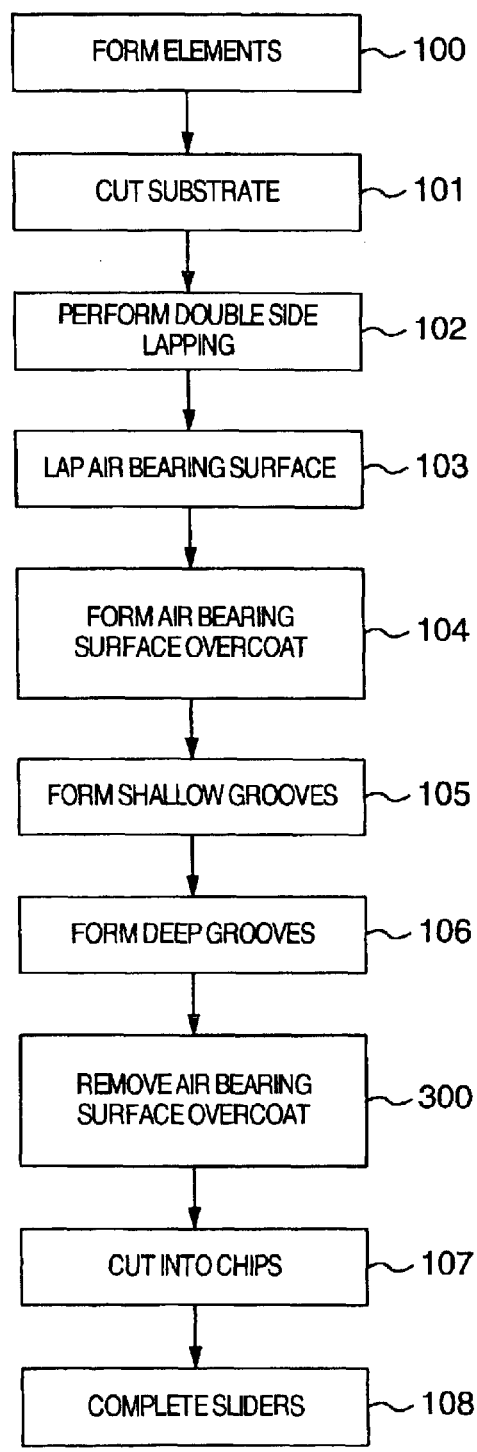
Figure 16:
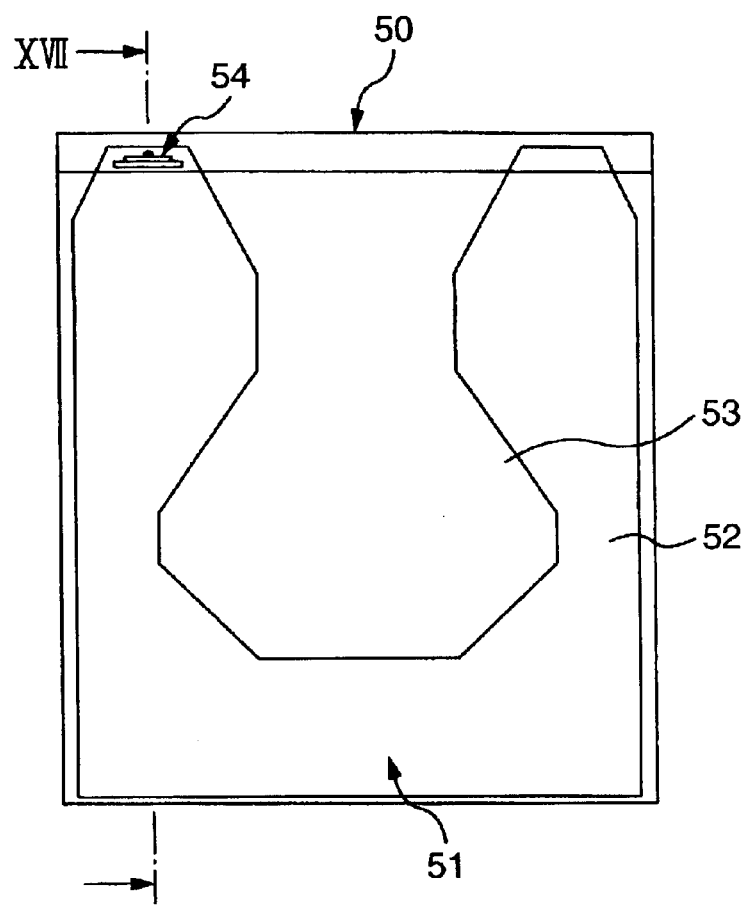
FIG. 16 is a top view showing a configuration of a disk-facing surface of a conventional thin film magnetic head slider.
Figure 17:
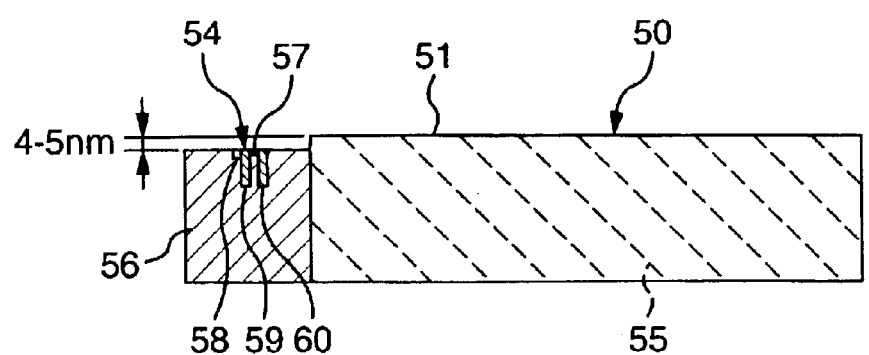
FIG. 17 is a cross sectional view showing a state where the disk-facing surface of the slider shown by arrows XVII—XVII in FIG. 16 has been lapped.
Figure 18:
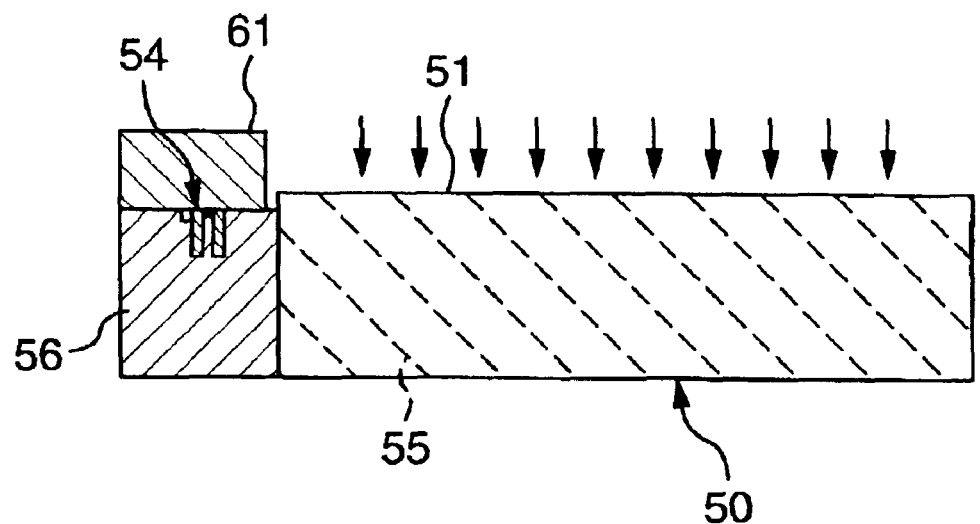
FIG. 18 is a sectional view showing a step of etching the surface of a substrate in the lapped disk-facing surface illustrated in FIG. 17.
Figure 19:
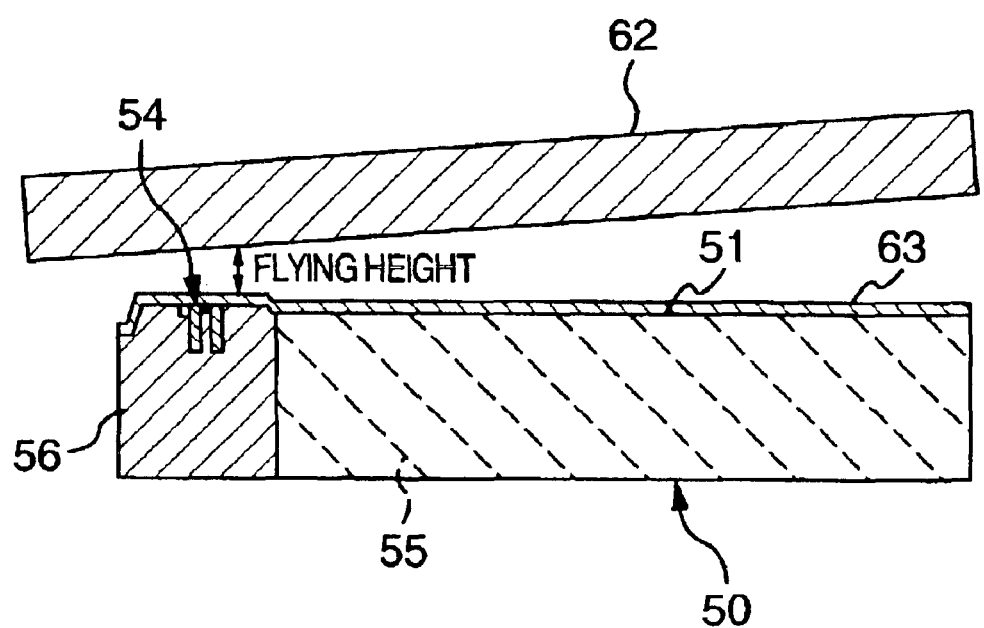
FIG. 19 is a sectional view showing a state where a protective film is formed over the etched disk-facing surface illustrated in FIG. 17.

FIGS. 14A and 14B are flowcharts that compare the manufacturing process of the thin film magnetic head according to the second embodiment with the manufacturing process of the thin film magnetic head illustrated in FIGS. 2 to 5. FIG. 14A shows the manufacturing process of the thin film magnetic head illustrated in FIGS. 2 to 5, while FIG. 14B shows the manufacturing process of the thin film magnetic head according to the second embodiment.

The manufacturing process of the thin film magnetic head illustrated in FIGS. 2 to 5, shown in FIG. 14A is the same as the manufacturing process described in FIG. 11A.

On contrast therewith, in the manufacturing process of the thin film magnetic head according to the second embodiment, the step 300 of eliminating the air bearing surface overcoat 13 is added between the deep groove formation step 106 and the chip cutting step 107, as shown in FIG. 14B.

In this step 300, part of the air bearing surface overcoat 13 in the region other than the region described above in the head element portion 7 is removed from the air bearing surface overcoat 13 formed in the step 104, thereby making the configuration illustrated in FIG. 13. The air bearing surface overcoat 13 has a dual structure that includes a silicon film and a DLC film. For this reason, the air bearing surface overcoat 13 is removed by Reactive Ion Etching (RIE) that can selectively remove a specific film. When using RIE to remove the DLC film, an $O_2$ gas was employed. While for removal of the silicon film, a $CF_4$+Ar gas was employed. The manufacturing process of the thin film magnetic head according to the second embodiment is the same as the manufacturing process shown in FIG. 14A, except for addition of this step.

The air bearing surface overcoat 13 may also be formed on only the above-mentioned region in the head element portion 7 in the step 104 in FIG. 14B. In this case, there is no need to add the step 300. Alternatively, the step 300 may be added between the step 104 and the step 105, or between the step 105 and the step 106.

The thin film magnetic head according to the second embodiment and the thin film magnetic head illustrated in FIGS. 2 to 5 for comparison were manufactured on the basis of the manufacturing processes described above, and the pole tip recessions resulting from the processes were measured. The manufacturing conditions were as follows:
(1) Film thickness of the air bearing surface overcoat 13: 5 nm
(2) Recession of the shallow groove surface 5 from the air bearing surface 4: 150 nm
(3) Recession of the deep groove surface 6 from the air bearing surface 4: 0.90 µm
(4) Measurement Condition and Measurement device: Digital Instrument's NanoScope IIIA Measured Surfaces: The air bearing surface of the head element portion 7 of the head for comparison before formation of the air bearing surface overcoat 13 was measured. The air bearing surface of the head element portion 7 of the head according to the second embodiment after formation of the air bearing surface overcoat was measured.

The Number of Sliders Measured: 20 sliders for each of both the head according to the second embodiment and the head for comparison FIG. 15 shows the results of measurement of the pole tip recessions using the AFM. In the second embodiment illustrated in FIG. 13, the pole tip recession or pole recession cannot be directly measured due to the air bearing surface overcoat 13. However, the recession of the air bearing surface overcoat 13 produced from the pole recession is almost equal to the pole recession with a negligible error, if any. Thus, the recession of the air bearing surface overcoat 13 was measured.

According to the results of measurement, in the thin film magnetic head for comparison, the same results as those in FIG. 11 were obtained. On contrast therewith, in the thin film magnetic head according to the second embodiment, the air bearing surface overcoat 13 is removed from the lapped surface of the substrate 14. The magnetic spacing will not be thereby influenced by the alumina recession. For this reason, it can be seen that the pole tip recession becomes the one based on the surface 23 of the air bearing surface overcoat 13 over the lapped surface of the base alumina 16, and that this pole tip recession has become 0.38 nm on the average, which is remarkably small. Accordingly, in the second embodiment as well, the pole tip recession can be greatly improved, thereby allowing a great reduction in the magnetic spacing.

In the second embodiment, the air bearing surface overcoat 13 can be left on the air bearing surfaces 4b and 4c of the air inflow end rail 10b. Alternatively it can be removed.

In the first and second embodiments described above, any of the MR head, GMR head, TMR head, or AMR head described above can be employed as the MR head element 12.

However, in the TMR head in particular, a TMR film (a barrier layer) is short-circuited due to a lapping clutch produced due to lapping of the air bearing surface. Thus, the resistance of the TRM element becomes lower than its intrinsic resistance. In order to solve this problem, in the TMR head, dry processing such as ion milling is applied to the lapped air bearing surface, thereby removing the influence of the lapping scratch. In this case, however, the problem has arisen that the pole tip recession from the lapped surface of the substrate 14 increases due to the dry processing.

On contrast therewith, in the first and second embodiments described above, the substrate 14 does not influence the pole tip recession that contributes to the magnetic spacing. Thus, even if the dry processing is performed, the resulting increase in the pole tip recession will not take place. Accordingly, even if the TMR head is employed as the MR head element, the effect of greatly improving the pole tip recession can be obtained. A great reduction in the magnetic spacing can be achieved.

As described before, in order to improve the surface roughness of the substrate 14, there is a trend toward changing the material for the substrate 14 from $Al_2O_3$—TiC to SiC. Compared with $Al_2O_3$—TiC, SiC is inferior in its processability. Thus, the problem has arisen that the alumina recession will increase.

However, in the first and second embodiments described above, the substrate 14 does not influence the pole tip recession associated with the magnetic spacing. Thus, even if SiC is employed for the substrate 14 and the alumina recession therefore increases, the magnetic spacing will not be influenced by the alumina recession. Accordingly, the magnetic spacing can be greatly reduced.

As described above, while maintaining the shallow dual step sub ambient slider that can reduce the flying height consistently, the present invention can further reduce the magnetic spacing consistently and can also reduce the area of the air bearing surface sufficiently. Hence, even if the disk-facing surface of the head is tilted or swayed, the danger of the air bearing surface being brought into contact with the surface of the disk will be eliminated.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A thin film magnetic head comprising head element portion, an island-like center rail and an air inflow end rail, the head element portion including a write head element and a read head element provided over a substrate through a base alumina, a disk-facing surface side including surfaces of the substrate and the head element portion, the island-like center rail protruding from a deep groove surface arranged at a center of an air outflow end, the air inflow end rail protruding from the deep groove surface arranged at an air inflow end, the island-like center rail including a shallow groove surface protruding with a predetermined recession from the deep groove surface, and an air bearing surface protruding with a predetermined recession from the shallow groove surface, wherein the air bearing surface of the island-like center rail is formed within a surface including the head element portion except for the substrate, and wherein at least one super shallow groove surface is provided between the air bearing surface and the shallow groove surface, the super shallow groove surface having a recession from the air bearing surface smaller than a recession to the shallow groove surface.

2. The thin film magnetic head according to claim 1, wherein a boundary between the air bearing surface and the super shallow groove surface is arranged on a region of the base alumina.

3. The thin film magnetic head according to claim 1, wherein an air bearing surface overcoat is provided over the air bearing surface of the island-like center rail.

4. A thin film magnetic head comprising a head element portion, a center rail, and an air inflow end rail, the head element portion comprising a write head element and a read head element provided over a substrate through base alumina, the center rail protruding from a deep groove surface in a form of an island and being provided in a center of an air outflow end of a disk-facing surface including a surface of the substrate and a surface of the head element portion, the air inflow end rail protruding from the deep groove surface in the form of an island and being provided at an air inflow end of the disk-facing surface, the center rail and the air inflow rail each including a shallow groove surface protruding from the deep groove surface by a predetermined height and an air bearing surface protruding from the shallow groove surface by a predetermined height, the surface of the head element portion being included in the air bearing surface of the center rail, wherein an air bearing surface overcoat is provided over a region of the air bearing surface of the center rail, the region including the surface of the head element portion, and a boundary of the air bearing surface overcoat is positioned on the base alumina between the head element portion and the substrate.

5. The thin film magnetic head according to claim 4, wherein a surface of the air bearing surface overcoat at least formed on the base alumina protrudes from the surface of the substrate.

6. The thin film magnetic head according to claim 1, wherein the write head element is an inductive magnetic head and the read head element is a magneto-resistance effect type head.

7. The thin film magnetic head according to claim 4, wherein the write head element is an inductive magnetic head and the read head element is a magneto-resistance effect type head.

8. A thin film magnetic head comprising:

a substrate;

a head element portion including a write head element and a read head element, provided over the substrate through a base alumina;

a disk-facing surface including a surface of the substrate and a surface of the head element portion;

a center rail protruding from a deep groove surface, in a form of an island, and being provided at a center of an air outflow end of the disk-facing surface;

an air inflow end rail protruding from the deep groove surface, in the form of an island, and being provided at an air inflow end of the disk-facing surface, wherein the center rail and the air inflow rail each includes a shallow groove surface protruding from the deep groove surface by a predetermined height and an air bearing surface protruding from the shallow groove surface by a predetermined height, the surface of the head element portion being included in the air bearing surface of the center rail, wherein an air bearing surface overcoat is provided over a region of the air bearing surface of the center rail, and a region including the surface of the head element portion, and wherein a boundary of the air bearing surface overcoat is positioned on the base alumina between the head element portion and the substrate.

9. The thin film magnetic head according to claim 8, wherein a surface of the air bearing surface overcoat at least formed on the base alumina protrudes from the surface of the substrate.

10. The thin film magnetic head according to claim 8, wherein the write head element is an inductive magnetic head and the read head element is a magneto-resistance effect type head.

* * * * *